United States Patent [19]
Kleinberg et al.

[11] Patent Number: 5,796,252
[45] Date of Patent: Aug. 18, 1998

[54] NUCLEAR MAGNETIC RESONANCE BOREHOLE LOGGING APPARATUS AND METHOD FOR ASCERTAINING A VOLUME OF HYDROCARBONS INDEPENDENT OF A DIFFUSION COEFFICIENT

[75] Inventors: Robert L. Kleinberg, Ridgefield, Conn.; Lawrence L. Latour, Mattituck, N.Y.; Abdurrahman Sezginer, Brookfield, Conn.

[73] Assignee: Schlumberger Technology Corporation, Ridgefield, Conn.

[21] Appl. No.: 783,778

[22] Filed: Jan. 15, 1997

Related U.S. Application Data

[63] Continuation of Ser. No. 394,994, Mar. 23, 1995, abandoned.

[51] Int. Cl.$^6$ .................................................. G01V 3/32
[52] U.S. Cl. .................................................. 324/303
[58] Field of Search .................................. 324/300, 303, 324/307, 309, 318; 335/296, 299

[56] References Cited

U.S. PATENT DOCUMENTS

| | | | |
|---|---|---|---|
| 3,657,730 | 4/1972 | Robinson et al. | 324/303 |
| 4,717,877 | 1/1988 | Taicher et al. | 324/303 |
| 4,719,423 | 1/1988 | Vinegar et al. | 324/303 |
| 5,023,551 | 6/1991 | Kleinberg et al. | 324/303 |
| 5,055,787 | 10/1991 | Kleinberg et al. | 324/303 |
| 5,055,788 | 10/1991 | Kleinberg et al. | 324/303 |
| 5,153,514 | 10/1992 | Griffin et al. | 324/303 |
| 5,212,447 | 5/1993 | Paltiel | 324/300 |
| 5,280,243 | 1/1994 | Miller | 324/303 |
| 5,291,137 | 3/1994 | Freedman | 324/303 |
| 5,363,041 | 11/1994 | Sezginer | 324/303 |
| 5,387,865 | 2/1995 | Jerosch-Herold et al. | 324/303 |
| 5,428,291 | 6/1995 | Thomann et al. | 324/303 |
| 5,486,762 | 1/1996 | Freedman et al. | 324/303 |
| 5,497,087 | 3/1996 | Vinegar | 324/303 |
| 5,498,960 | 3/1996 | Vinegar et al. | 324/303 |

FOREIGN PATENT DOCUMENTS

| | | | |
|---|---|---|---|
| 0 489 578 A1 | 6/1992 | European Pat. Off. | G01V 3/32 |
| 0581666 | 2/1994 | European Pat. Off. | 324/303 |
| 2 279 754 | 1/1995 | United Kingdom | G01R 33/44 |

OTHER PUBLICATIONS

N. R. Morrow, I. Chatzis, D. Siegel, J. J. Taber, "Corrections to In-Situ Measurements of Residual Oil for Flushing at the Wellbore", Journal of Canadian Petroleum Technology, vol. 24, No. 4, p. 54 (Jul. 1985).

G. Setser, M. R. Williams, Measurement of Remaining Oil Saturation in Northern Michigan Using Nuclear Magnetism Log Data and Pressure Core, Society of Petroleum Engineers, Paper 14276 (1985).

Abragam, Principles of Nuclear Magnetism, Clarendon Press (Oxford, 1996).

Farrar and Becker, Pulse and Fourier Transform NMR, Academic Press (New York 1971).

E. O. Stejskal, J. E. Tanner, "Spin Diffusion Measurements: Spin Echoes in the Presence of a Time–Dependent Field Gradient", Journal of Chemical Physics, 42,288 (1965).

(List continued on next page.)

Primary Examiner—Sandra L. O'Shea
Assistant Examiner—Roger Phillips
Attorney, Agent, or Firm—Brigitte L. Jeffery; Keith G. W. Smith

[57] ABSTRACT

A nuclear magnetic resonance (NMR) logging technique reveals the volume of hydrocarbons in an earth formation. The differences in viscosity among gas, oil and water are used to distinguish among these three fluids. During NMR logging, a parameter of a sequence of magnetic field pulses is altered, causing echo signal strengths to vary due to the diffusion of the fluids in the formation. The volume of hydrocarbons in the formation is determined from detected spin echo strengths. The invention applies to wireline NMR logging and NMR logging-while-drilling techniques.

34 Claims, 17 Drawing Sheets

OTHER PUBLICATIONS

J.C.M. Li, P. Chang, "Self–Diffusion Coefficient and Viscosity in Liquids", Journal of Chemical Physics 23,518 (1955).

P.C.M. van Zij, C.T.W. Moonen, "Complete Water Suppression for Solutions of Large Molecules Based on Diffisuional Differences Between Solute and Solvent", Journal of Magnetic Resonance 87, 18 (1990).

Butler et al., "Estimating Solutions of First Kind Integral Equations with Non–Negative Constraints and Optimal Smoothing", SIAM Journal of Numcerical Analysis, vol. 18, No. 3, Jun. 1981.

Tanner, "Use of the Stimulated Echo in NMR Diffusion Studies", Journal of Chemical Physics, vol. 52, No. 5, Mar. 1970.

Latour et al., Improved PFG Stimulated Echo Method for the Measurement of Diffusion in Inhomogeneous Fields, Journal of Magnetic Resonance, Ser. B., vol. 101, 72–77, Feb. 1993.

Latour et al., "Time Dependent Diffusion Coefficient of Fluids in Porous Media as a Probe of Surface–to–Volume Ratio", Journal of Magnetic Resonance, Series A, vol. 101, 342–346, Feb. 1993.

L.E. Drain, "The Broadening of Magnetic Resonance Lines Due to Field Inhomogeneities in Powered Samples", Proceedings of the Physical Society, 80,1380 (1962).

J. A. Glasel, K. H. Lee, "On the Interpretation of Water Nuclear Magnetic Resonance Relaxation Times in Heterogeneous System", Journal of American Chemical Society 96, 970 (1974).

E. L. Hahn, "Spin Echoes", Physical Review 80,580 (1950).

R. M. Cotts et al., "Pulsed Field Gradient Stimulated Echo Methods for IMproved NMR Diffusion Measurements in Heterogeneous Systems" Journal of Magnetic Resonance, vol. 83, 252, Jun. 1989.

Schlumberger Log Interpretation Principles/Applications (1987).

R. Akkurt, H. J. Vinegar, P. N. Tutunjian, and A. J. Guillory, "NMR Logging of Natural Gas Reservoirs", SPWLA 36th Annual Logging Symposium, Jun. 26–29, 1995, pp. 1–12.

A. Sezginer, R. L. Kleinberg, M. Fukuhara, and L. L. Latour, "Very Rapid Simultenous Measurement of Nuclear Magnetic Resonance Spin–Lattice Relaxation Time and Spin–Spin Relaxation Time", Journal of Magnetic Resonance, vol. 92, pp. 504–527, 1991.

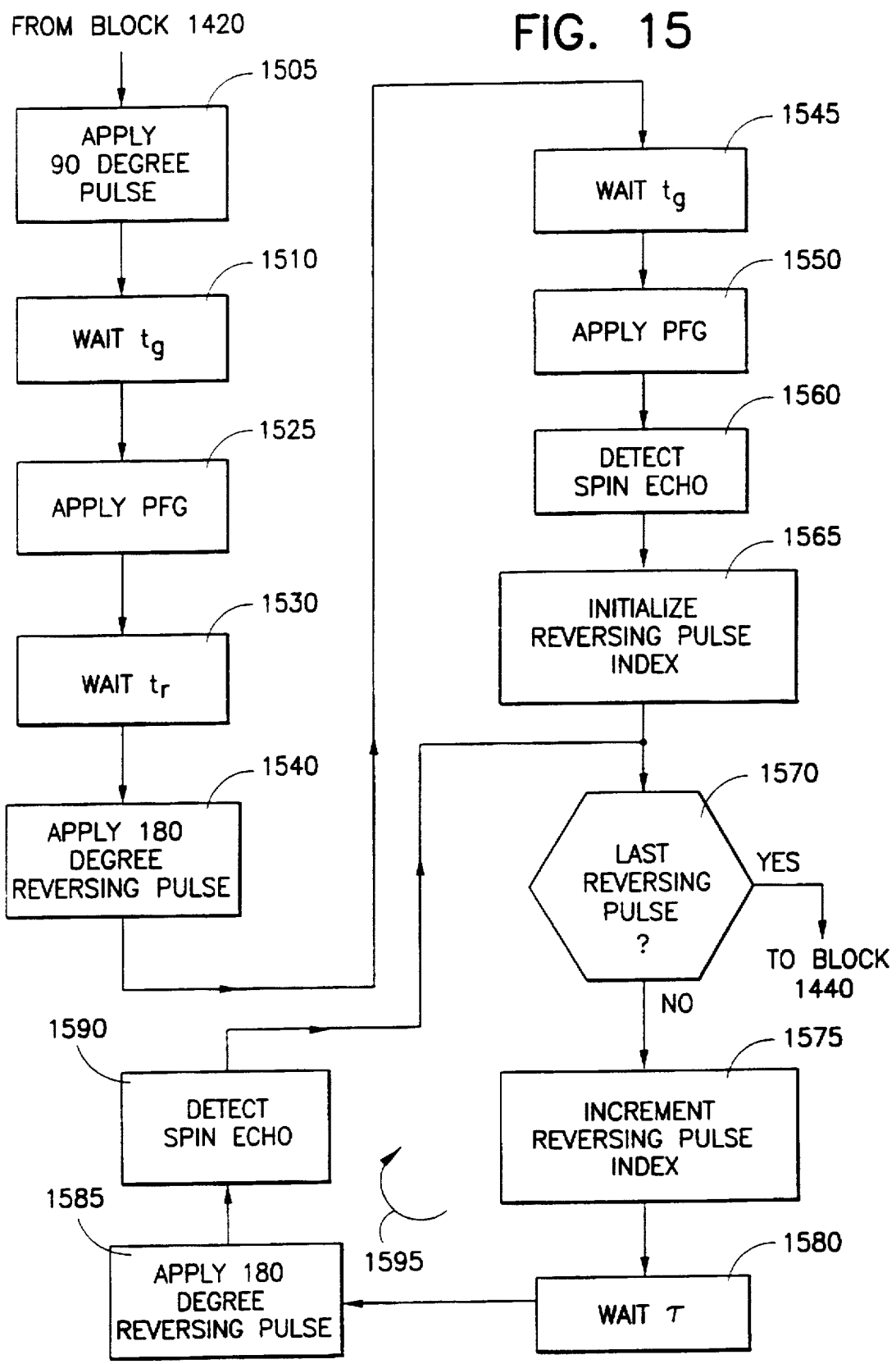

NUCLEAR MAGNETIC RESONANCE BOREHOLE LOGGING APPARATUS AND METHOD FOR ASCERTAINING A VOLUME OF HYDROCARBONS INDEPENDENT OF A DIFFUSION COEFFICIENT

This application is a file wrapper continuation of parent application Ser. No. 08/394,994 filed Mar. 23, 1995 now abandoned.

FIELD OF THE INVENTION

This invention relates to apparatus and techniques for determining characteristics of earth formations surrounding a borehole and, more particularly, to an apparatus and method for nuclear magnetic resonance (NMR) borehole logging to determine residual oil saturation and other formation characteristics.

BACKGROUND OF THE INVENTION

A major goal in the evaluation of hydrocarbon bearing earth formations is the accurate determination of the volumes of oil and water in the pore space of sedimentary rocks. Measurements made with signals from logging instruments have been used to obtain estimates of these volumes. However, these methods are approximate and are useful as rough guides to production strategies. The most credible measurement of producible fluid volumes is to actually produce fluids from the formation, such as by using a drill stem test or by using a logging device that extracts fluids from the formations.

The above methods are useful for estimating oil and water saturations in formations from which oil has not yet been produced. When a new reservoir is discovered, it is first produced by natural hydraulic pressure and then by flooding the formation with water forced down a neighboring well. These are the primary and secondary recovery techniques. They are relatively inexpensive to implement, but leave a substantial amount of residual oil in place. The residual oil is generally about thirty percent of the total oil originally contained in the reservoir.

Methods used to extract the vast amount of residual oil left after secondary recovery are termed tertiary or enhanced oil recovery (EOR). A variety of EOR methods are employed, including steam flooding, miscible fluid sweeps, and other techniques. All such techniques are relatively expensive. The economics of EOR depend critically on the quantity of residual oil in the formation; that is, the residual oil saturation (ROS). Existing methods of determining ROS are often not precise enough to determine the economic viability of EOR projects, and one of the objects of the present invention is to improve the accuracy of ROS determinations for this and other purposes.

Existing nuclear magnetic resonance logging devices can determine ROS and other formation characteristics, but with limitations. More than twenty years ago, the assignee hereof commercialized a logging device called the "Nuclear Magnetism Tool". This tool has a large coil to which direct current is applied. The resulting static field polarizes nuclear spins (protons) in a region approximately one foot in radius centered on the mandrel on which the coil is mounted. The current is then switched off, and the nuclear spins in the polarized region precess in the earth's magnetic field, inducing a voltage in the coil. The proton signal is selected using a bandpass filter. The length of time the direct current is passed through the coil before being turned off is systematically varied. By correlating the amplitude of the received voltage with the length of time the direct current is left on immediately prior to the measurement, the nuclear magnetic resonance properties of the earth material of the formation can be determined. This type of tool can make a measurement of ROS. Because nuclear magnetic resonance logging devices have relatively shallow depths of investigation, the probe volume is typically flooded to residual oil saturation by invasion of drilling mud filtrate [N. R. Morrow, I. Chatzis, D. Siegel, J. J. Taber, "Corrections to In-Situ Measurements of Residual Oil for Flushing at the Wellbore", Journal of Canadian Petroleum Technology vol. 24, no. 4, p. 54 (July 1985)]. After a well is drilled, a water solution of manganese complexed with ethylene diamine tetraacetate (Mn-EDTA) is introduced into the wellbore and allowed to penetrate the formation. The paramagnetic manganese ion reduces the NMR relaxation time of the water fraction to less than 25 ms, so the water fraction becomes invisible to the NMR logging device. Because the Mn-EDTA is not soluble in oil, the nuclear magnetic resonance signal from the oil is unaffected, so the amplitude of the signal detected by the logging device is approximately proportional to the ROS.

When an NMR logging device is employed in the described fashion, there can be uncertainty as to whether the MN-EDTA solution has sufficiently saturated the formation throughout the volume of investigation of the logging device which extends several inches into the formation. If the Mn-EDTA is not present in sufficient concentration, ROS will be overestimated. Therefore, in employing this type of logging approach, users go to extraordinary lengths to ensure that the pore water is thoroughly saturated with Mn-EDTA [G. Setser, M. R. Williams, "Measurement of Remaining Oil Saturation in Northern Michigan Using Nuclear Magnetism Log Data and Pressure Core", Society of Petroleum Engineers, Paper 14276 (1985)]. The procedure typically involves running several borehole logging runs before and after application of Mn-EDTA. Also, because manganese is not used in the original drilling process, it is necessary to ream the hole to introduce it. These steps involve considerable expense.

In recent years, improved nuclear magnetic well logging devices and techniques have been proposed and/or developed. A summary of these devices and techniques is presented in U.S. Pat. No. 5,023,551, assigned to the same assignee as the present application. The referenced '551 Patent also reviews basic principles of NMR and NMR logging, and part of that review will be summarized. Reference can be made to the '551 Patent for further detail.

NMR has been a common laboratory technique for forty years, and a theoretical description is available in Abragam, Principles of Nuclear Magnetism, Clarendon Press (Oxford, 1961), and Farrar and Becker, Pulse and Fourier Transform NMR, Academic Press (New York 1971). NMR is based on the fact that the nuclei of many elements have angular momentum ("spin") and a magnetic moment. The nuclear spins align themselves along an externally applied static magnetic field. This equilibrium situation can be disturbed by a pulse of an oscillating magnetic field, which tips the spins away from the static field direction. The angle through which the spins are tipped is under the control of the experimenter, as explained below.

After tipping, two things occur simultaneously. First, the spins precess around the static field at a particular frequency (i.e. the Larmor frequency), given by $\omega_o = \gamma B_o$ where $B_o$ is the strength of the static field and $\gamma$ is the gyromagnetic ratio, a nuclear constant. Second, the spins return to the equilibrium direction according to a decay time known as the "spin lattice relaxation time" or T1. For hydrogen nuclei, $\gamma/2\pi =$ 4258 Hz/Gauss, so for a static field of 235 Gauss, the frequency of precession is 1 MHz. T1 is controlled totally by the molecular environment and is typically ten to one thousand milliseconds for water and oil in rocks.

Also associated with the spin of molecular nuclei is a second relaxation time known as the "spin-spin relaxation time", or T2. At the end of a ninety degree tipping pulse, all the spins are pointed in a common direction perpendicular to the static field, and they all precess at the Larmor frequency. However, because of small inhomogeneities in the static field due to imperfect instrumentation or microscopic material heterogeneities, each nuclear spin precesses at a slightly different rate. Hence, after a time that is long compared to the precession period, but shorter than T1, the spins will no longer be precessing in unison. When this "dephasing" is due to static field inhomogeneity of the apparatus, the dephasing is called T2*. When it is due to properties of the material, the dephasing time is called T2. T2 and T2* can be measured independently. For liquids in rocks, T2 is approximately two-thirds of T1.

As aforementioned, the parameters T1 and T2 are sensitive to molecular environment. For example, T2 can be several seconds in an unconfined low viscosity liquid such as water, while it can be as short as ten microseconds in a solid. Liquids confined in the pores of rocks present an intermediate case with T2 in the range of tens to hundreds of milliseconds, depending on pore size and fluid viscosity.

In the basic NMR measurement, a pulse of oscillating field is applied to the sample to tip the spins of the nuclei in the sample. The angle (in radians) through which the spins are tipped is given by the equation $$\theta = \gamma B_1 t_p / 2 \quad (1)$$

where $\gamma$ is the gyromagnetic ratio, $B_1$ is the linearly polarized oscillating field strength, and $t_p$ is the duration of the pulse. Tipping pulses of ninety and one hundred and eighty degrees are the most common.

The precessing spins are detected by voltage induced in a coil. Only that component of the nuclear magnetization that is precessing in the plane perpendicular to the static field can be sensed by the coil. Hence, a signal will be generated after a ninety degree tipping pulse but not after a one hundred eighty degree tipping pulse. In fact, after a one hundred eighty degree tipping pulse, the spins do not precess at all, but just slowly return along the $B_o$ axis to the equilibrium direction.

In measuring the spin-lattice relaxation time T1, many different techniques are known both in the material science arts and in the medical arts. The "inversion recovery" technique suggests that after the nuclei have aligned themselves along the static magnetic field, a one hundred eighty degree pulse is applied to reverse the direction of the spins. Over time, the spins decay toward their equilibrium direction according to T1, but no measurement is yet made as the one hundred eighty degree pulse does not induce a signal in the coil. Before the decay is complete, however, it is interrupted by a ninety degree pulse which rotates the spins into the measurement plane (i.e., induces a signal in the coil). However, the measurable signal lasts only as long as the spins precess in unison. As they dephase, the net magnetization decreases, even if all the spins remain in the transverse plane. Therefore, the signal decays exponentially with time constant T2*, also known as the "free induction decay". Fortunately, the information of interest is the amplitude of the signal immediately after the ninety degree "read out" pulse. This amplitude depends on the "recovery time" ($\tau$) between the original one hundred eighty degree pulse and the ninety degree pulse. Following a determination of amplitude, the spin system is permitted to completely relax back to equilibrium, and the pulse sequence is then repeated preferably numerous times with different recovery times. The detected amplitudes are then plotted against $\tau$ with the decay typically being expressed as a single exponential.

The inversion recovery technique for measuring T1 has been used in laboratories for about forty years. It is very time consuming, and therefore undesirable for well logging and other material property investigations. To overcome some of the shortcomings of inversion recovery, other techniques such as preparation recovery, steady state, and magnetization conserving techniques have been developed. Reference can be made to the above noted U.S. Pat. No. 5,023,551.

While many different methods for measuring T1 have been developed, a single standard known as the CPMG sequence (Carr-Purcell-Meiboom-Gill) for measuring T2 has evolved. In solids, where T2 is very short, T2 can be determined from the decay of the free induction signal. In liquids, where T2*<<T2, the free induction decay becomes a measurement of the apparatus-induced inhomogeneities. To measure the true T2 in such situations, it is necessary to cancel the effect of the apparatus-induced inhomogeneities. To accomplish the same, a series of pulses is applied. First a ninety degree pulse causes the spins to start precessing. Then a one hundred eighty degree pulse is applied to keep the spins in the measurement plane, but to cause the spins which are dispersing in the transverse plane to reverse direction and to refocus. By repeatedly reversing the spins using one hundred eighty degree pulses, a series of "spin echoes" appear. This succession of one hundred eighty degree pulses after an initial ninety degree pulse is the Carr-Purcell sequence which measures the irreversible dephasing (i.e., T2) due to material properties.

While the Carr-Purcell sequence would appear to provide a solution to eliminating apparatus induced inhomogeneities, it was found by Meiboom and Gill that if the one hundred eighty degree pulses in the Carr-Purcell sequence were slightly misset, the transverse magnetization would steadily be rotated out of the transverse plane. As a result, substantial errors would enter the T2 determination. Meiboom and Gill devised a modification to the Carr-Purcell pulse sequence such that after the spins are tipped by ninety degrees and start to dephase, the carrier of the one hundred eighty degree pulses is phase shifted relative to the carrier of the ninety degree pulse. As a result, any error that occurs during an even pulse of the CPMG sequence is cancelled out by an opposing error in the odd pulse.

The above-referenced U.S. Pat. No. 5,023,551 disclosed, inter alia, an improved pulse sequence for use in NMR borehole logging, called Fast Inversion Recovery/CPMG (FIR/CPMG). This pulse sequence can be set forth in NMR notation as $$[W_i\text{-}180\text{-}\tau_i\text{-}90\text{-}(t_{cp}\text{-}180\text{-}t_{cp}\text{-}\text{echo})_j]_i$$

where $j=1,2,\ldots,J$, where $J$ is the number of echoes collected in the CPMG sequence and is typically on the order of one or two hundred, but always greater than ten; $i=1,2,\ldots,I$, where $I$ is the number of recovery times; $W_i$ are waiting times; $\tau_i$ are recovery times, and $t_{cp}$ is the Carr-Purcell spacing. Measurements of the signals induced in the formation as a result of the magnetic fields are made of each of a predetermined number of echoes. In an embodiment disclosed in the '551 Patent, each echo measurement of the CPMG sequence is a measurement of the integrated amplitude of the echo, rather than a measurement of the greatest amplitude of the received echo. Determinations of T1, T2, and amplitude ($M_o$) are then made from the measurements. From one or more of the T1, T2, and amplitude determinations, formation parameters such as porosity and permeability can be derived using relationships known in the art.

A technique of interest herein is pulsed field gradient (PFG) nuclear magnetic resonance, which has long been used in the laboratory to measure the diffusion coefficient of materials [see e.g., E. O. Stejskal, J. E. Tanner, "Spin Diffusion Measurements: Spin Echoes in the Presence of a Time-Dependent Field Gradient", Journal of Chemical Physics, 42,288 (1965)]. The PFG pulse sequence is illustrated in FIG. 1. After the nuclear spins are polarized by the static field, a 90° RF pulse tips them into the transverse plane. Then a pulse of magnetic field gradient is applied. A 180° RF pulse followed by a second gradient pulse refocuses the spins into an echo. The echo amplitude can be written $$A(2\tau)=A(0)\exp[-\gamma^2 D\delta^2 g^2(\Delta-\delta/3)] \quad (3)$$

$A(2\tau)$ is the echo amplitude where $2\tau$ is the time of echo formation, $A(0)$ is proportional to the number of spins resonated, D is the diffusion coefficient, $\gamma$ is the gyromagnetic ratio of the resonated nucleus, g is the strength of the applied magnetic field gradient, $\delta$ is the gradient pulse width, and $\Delta$ is the time between the leading edges of the two gradient pulses, as shown in FIG. 1. FIG. 2, which plots phase versus time, illustrates how the pulsed field gradient sequence is useful in measuring the diffusion coefficient of a substance in the gradient field. Consider the difference in behavior between a spin that has moved and one which has not. After application of the 90 degree pulse and prior to the first gradient pulse, both spins exhibit a relatively slow phase change (dephasing) due to background gradient. The gradient pulse results in rapid phase change, and then, after the gradient pulse, slow phase change continues. The 180 degree pulse reverses the spins, and they now begin to change phase in the opposite sense (rephase); slowly, except during application of the second gradient pulse. For a spin that has not moved significantly, the phase will return to zero (its original phase) and contribute to the spin echo. However, a spin that has moved (diffused) to a significantly different position in the gradient field will not rephase to zero, and will not contribute to the echo.

SUMMARY OF THE INVENTION

From the viewpoint of nuclear magnetic resonance, the most important difference between oil and water is viscosity. The viscosity of many crude oils is at least an order of magnitude greater than water. The viscosity is related to the diffusion coefficient through the relation $$D=c(N/V)^{1/3}kT/\eta \quad (4)$$

where D is the self-diffusion coefficient of a pure fluid, k is Boltzmann's constant, T is the absolute temperature, (N/V) is the molecular number density, $\eta$ is the viscosity, and c is a constant whose numerical value is around ⅙ for a wide range of liquids. [J. C. M. Li, P. Chang, "Self-Diffusion Coefficient and Viscosity in Liquids", Journal of Chemical Physics 23, 518 (1955)]. Where two fluids present in the NMR investigation region have different diffusion coefficients, the signals from the two fluids add in the spin echo. Thus, if there is a large difference in diffusion coefficients, it is possible to find a combination of pulse sequence parameters for which the contribution of the rapidly diffusing liquid is eliminated from the echo signal while the contribution from the slowly diffusing liquid is essentially unaffected. This method has been used to suppress the signal of a solvent so that the NMR spectrum of a more slowly diffusing solute can be studied [P. C. M. van Zijl, C. T. W. Moonen, "Complete Water Suppression for Solutions of Large Molecules Based on Diffusional Differences Between Solute and Solvent", Journal of Magnetic Resonance 87, 18 (1990)]. In a technique hereof the relatively large difference between the diffusion coefficients of oil and water is exploited in distinguishing the components of the NMR signal from oil and from water.

In accordance with an embodiment of the invention, there is provided a nuclear magnetic resonance method for determining the volume of hydrocarbons in a region of investigation of earth formations surrounding a borehole, comprising the following steps: a) providing a logging device that is moveable through the borehole; b) generating, from the logging device, a static magnetic field in the region of investigation of the formations; c) generating, from the logging device, a sequence of magnetic field pulses in the region of investigation of the formations, and detecting the nuclear magnetic resonance spin echo strength from the formations; d) varying a parameter of the sequence of magnetic field pulses that causes said echo strength to vary with the diffusion times of fluid species in the formations, and repeating step (c) a plurality of times to detect the echo strength of further nuclear magnetic spin echoes from the formations; and e) determining the volume of hydrocarbons in the region of investigation of the earth formations from the detected spin echo strengths. In a preferred embodiment of the invention, the step (e) comprises determining the volume of hydrocarbons from echo strengths associated with diffusion times longer than a pre-determined diffusion time. In an embodiment of the invention, the step (c) comprises generating a sequence of RF magnetic field pulses and magnetic field gradient pulses. In this embodiment, the step of generating pulses of magnetic field gradient in the formations comprises applying a direct current to an electrically conductive loop in the logging device.

In one embodiment hereof, the sequence of pulses and echoes of step (c) is $$90\text{-}t_g\text{-pfg-}t_r\text{-}180\text{-}t_r\text{-pfg-}t_r\text{-echo}_1\text{-}[\tau_i\text{-}180\text{-}\tau_i\text{-echo}_{i+1}]_i$$

where pfg is a pulsed field gradient, $t_g$ is the time between the 90 degree pulse and the pulsed field gradient, $t_r$ is the time between the pulsed field gradient and the 180 degree reversing pulse, $echo_1$ is the first spin echo, $\tau_i$ are Carr-Purcell spacings for the subsequent 180 degree reversing pulses and echoes (i=1,2, ... ).

In another embodiment hereof, the sequence of pulses and echoes is:

$$90\text{-}t_1\text{-}90\text{-}t_s\text{-}90\text{-}t_1\text{-echo}_1\text{-}[\tau_i\text{-}180\text{-}\tau_i\text{-echo}_{i+1}]_i$$

where $t_1$ is the time between the initial 90 degree pulse and the second 90 degree pulse, $t_s$ is the time between the second and third 90 degree pulses, and $\tau_i$ are the Carr-Purcell spacings (times) for the subsequent 180 degree reversing pulses and echoes (i=1,2 ... ); d) repeating step (c) a plurality of times with different times $t_1$ or $t_s$; and e) computing the volume of oil in said region of investigation from the spin echoes detected in steps (c) and (d).

Further features and advantages of the invention will become more readily apparent from the following detailed description when taken in conjunction with the accompanying drawings.

BRIEF DESCRIPTION OF THE DRAWINGS

FIG. 15 is a flow diagram of a routine represented by a block of the FIG. 14 routine, for applying a pulse sequence and storing echo responses.

DETAILED DESCRIPTION

Figure 1:
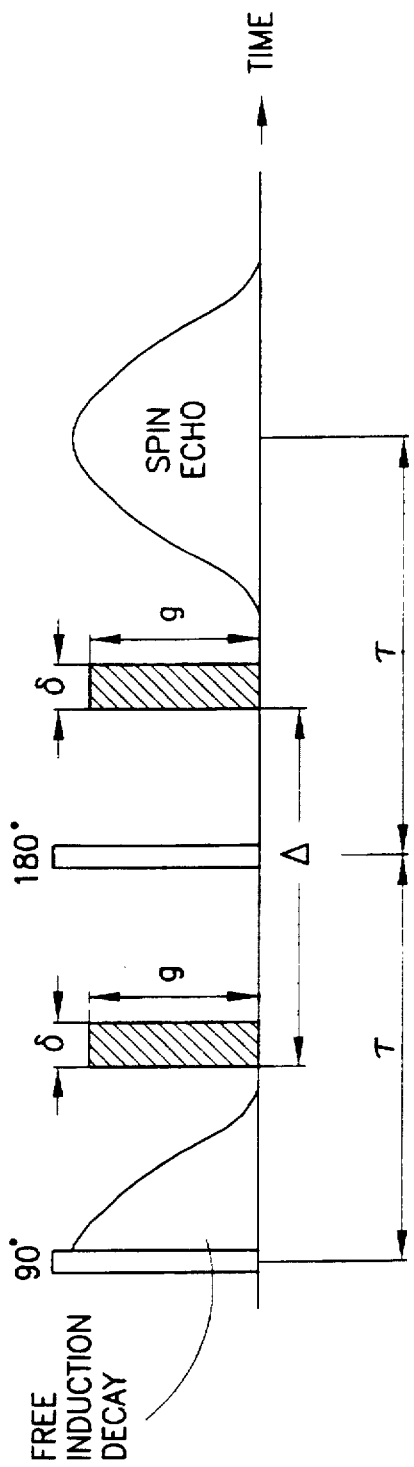
FIG. 1 is a diagram illustrating a prior art pulsed field gradient pulse sequence for nuclear magnetic resonance.
Figure 2:
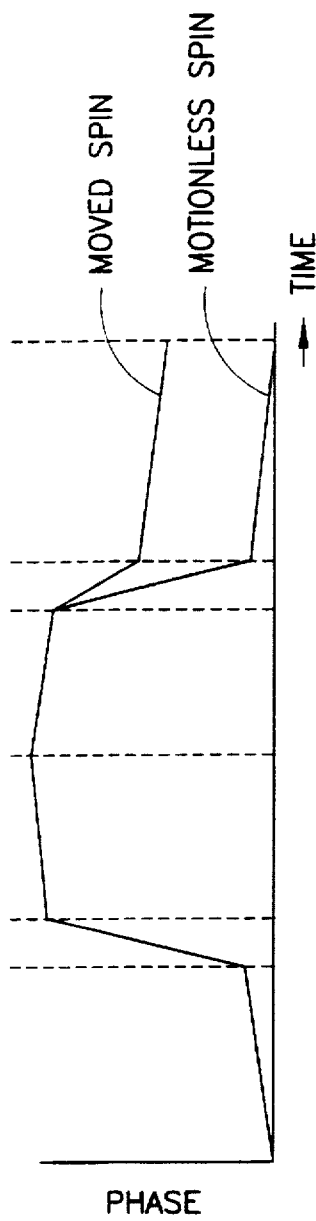
FIG. 2 is a diagram of phase versus time for a moved (diffused) spin and a motionless spin, subjected to the pulse sequence of FIG. 1.
Figure 3:
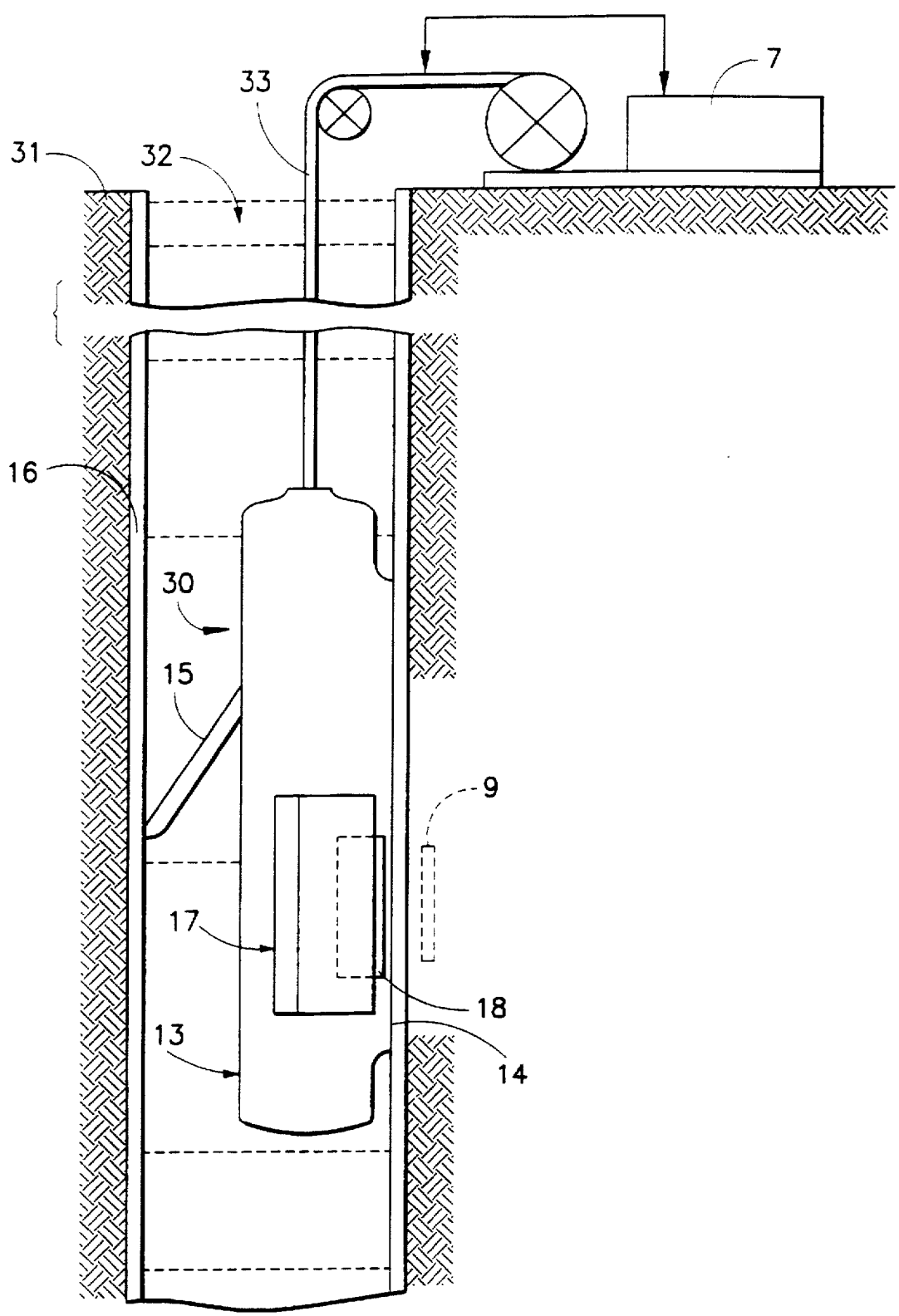
FIG. 3 is a diagram, partially in block form, of a nuclear magnetic resonance logging apparatus which can be used in practicing an embodiment of the invention.

Referring to FIG. 3, there is shown an apparatus for investigating subsurface formations 31 traversed by a borehole 32, which can be used in practicing embodiments of the invention. The borehole 32 is typically, although not necessarily, filled with a drilling fluid or mud which contains finely divided solids in suspension, and mudcake 16 is shown on the walls of the borehole.

An investigating apparatus or logging device 30 is suspended in the borehole 32 on an armored cable 33, the length of which substantially determines the relative depth of the device 30. The cable length is controlled by suitable means at the surface such as a drum and winch mechanism (not shown). Surface equipment, represented at 7, can be of conventional type, and can include a processor subsystem and communicates with the downhole equipment. As described in the U.S. Pat. No. 5,055,788, the device 30 has a face 14 shaped to intimately contact the borehole wall, with minimal gaps or standoff, and a retractable arm 15 which can be activated to press the body of the tool 13 against the borehole wall during a logging run, with the face 14 pressed against the wall's surface. Although the tool 13 is shown as a single body, the tool may alternatively comprise separate components such as a cartridge, sonde or skid, and the tool may be combinable with other logging tools. Also, while a wireline is illustrated, alternative forms of physical support and communicating link can be used, for example in a measurement while drilling system.

The logging device 30 includes a magnet array 17 and an RF antenna 18 positioned between the array 17 and the wall engaging face 14. Magnet array 17 produces a static magnetic field $B_0$ in regions surrounding the tool 13. The antenna 18 produces, at selected times, an oscillating magnetic field $B_1$ which is focussed into formation 31, and is superposed on the static field $B_o$ within those parts of formation opposite the face 14. The "volume of investigation" of the tool, shown in dotted lines in FIG. 3, is a vertically elongated region directly in front of tool face 14 in which there is a point at which the magnetic field produced by the magnet array 17 has a spatial gradient which is approximately zero. As described in the referenced Patent, the tool 13 can make measurements by magnetically tipping the nuclear spins of particles in formation 31 with a pulse of oscillating field $B_1$, and then detecting the precession of the tipped particles in the static, homogeneous field $B_o$ within the volume of investigation over a period of time.

Figure 4:
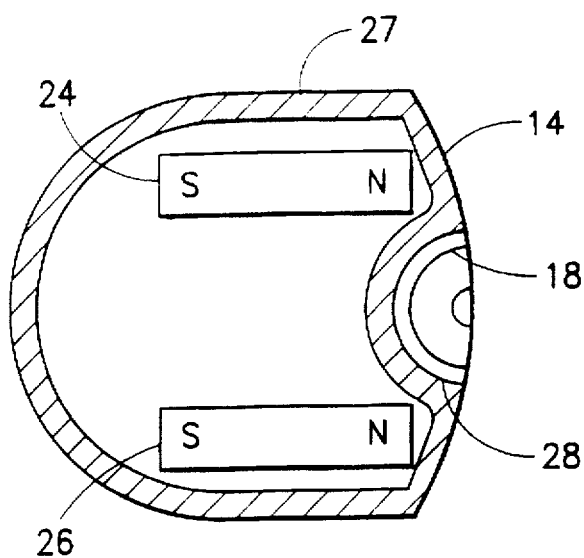
FIG. 4 is a cross-sectional diagram of a portion of the FIG. 3 nuclear magnetic resonance logging apparatus.

FIG. 4 shows a magnet array 17 of the type disclosed in an embodiment of the referenced '788 Patent. The magnet array includes two permanent magnets 24 and 26, which are mounted generally parallel to each other within a metal alloy body 27. The body 27 should be of a material having low magnetic permeability, so as to not interfere with the static magnetic field. Magnets 24 and 26 are slabs which are elongated in the longitudinal direction of the borehole. The magnetic poles of each magnet are not on the smallest faces of the slab, commonly viewed as the ends of a bar magnet; instead, the poles appear on the two opposing edges of the slab magnet and point to the left and right, respectively, in the Figure. Therefore, within the formation 31, the magnetic field $B_o$ surrounding the magnets remains fairly constant along the longitudinal direction of the borehole axis. In the illustration of FIG. 4, magnets 24, 26 are symmetrically mounted in the two sides of the body 27 with the north poles facing the same direction, that is, the direction of the face 14 of the tool. One or more further permanent magnets can be used.

Figure 5:
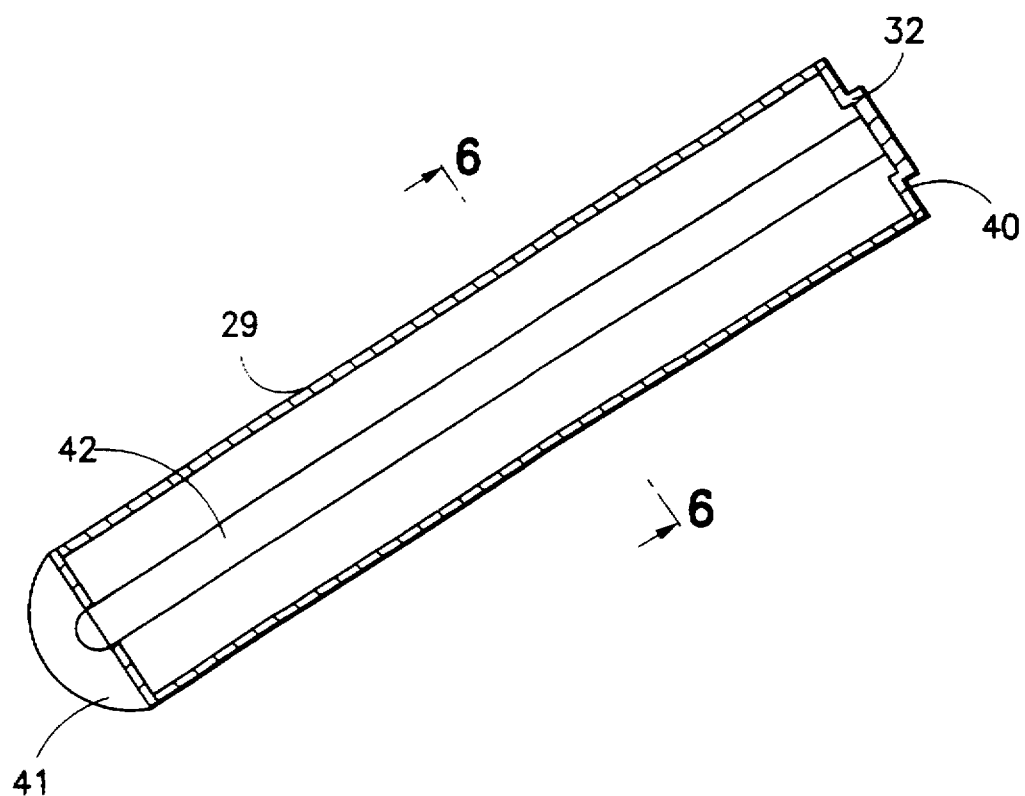
FIG. 5 is a perspective view of the RF antenna of the FIG. 3 nuclear magnetic resonance logging apparatus.
Figure 6:
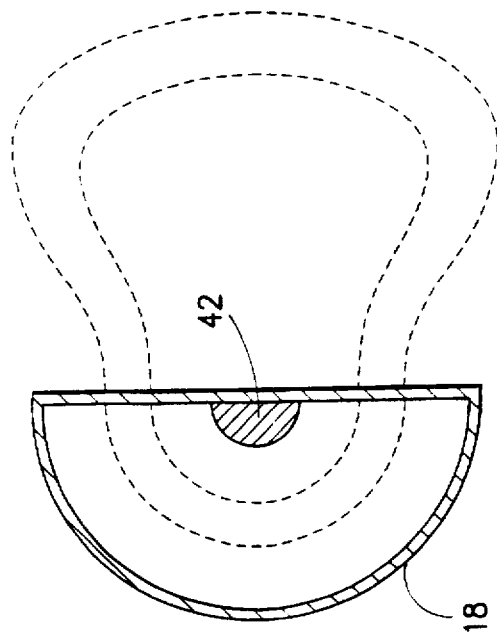
FIG. 6 is a cross-sectional view of the RF antenna of FIG. 5, as taken through a section defined by the arrows 6—6 in FIG. 5.

As described in the referenced '788 Patent, the metal body 27 has, on the front face 14 thereof, a semi-cylindrically shaped cavity or slot 28 which faces formations engaged by the face 14. The cavity 28 is adapted for receiving an RF antenna 18 that is shown in FIGS. 5–6. The antenna 18 is positioned outside of the metal body 27 (FIG. 4) of the tool, and is thereby shielded from electromagnetic communication with regions of the borehole which lie behind the body 27, or regions of other formations in directions intercepted by the body 27. Antenna 18 is thus responsive only to magnetic fields originating in front of the wall engaging face 14, e.g., fields originating in the formation 31 in the vicinity of the antennas 18. In a disclosed embodiment of the referenced Patent, the body 27 is made of metal alloy sheathing, rigidly attached to interior metal bracing, which envelops most components of the tool other than the antenna 18, including the circuitry, the magnet array 17, and the hydraulics system of the arm 15. The Patent points out that the body 27 can alternatively be constructed of other materials, so long as the overall structure is sufficiently strong and the magnetic field of the magnet array 17 can penetrate the body and enter the adjoining formation 31.

In the referenced '788 Patent, the antenna 18 is used both as an RF transmitter to produce an oscillating magnetic field in the formations, and as a receiving antenna to detect coherent magnetic signals emanating from precessing protons (spins) after the oscillating field is terminated. The antenna, which has a body 29 and an elongated center probe 42, across which signals are applied and detected, serves effectively as a current loop which produces an oscillating magnetic field $B_1$ (see FIG. 6) within the volume of investigation that is perpendicular to the static magnetic field, $B_0$ (which is radial in the volume of investigation). The body 29 is trough-shaped and has end plates 40, 41 with the center conductor or probe 42 extending from one end plate 40 to the other end plate 41, parallel to and centered in the semi-cylindrical trough 29. The U.S. Pat. No. 5,153,514 discloses that the trough antenna, which can be filled with a ferrite, can have an inner conductive shell that is separated from a steel body by a rubber layer, which suppresses magnetoacoustic ringing. Before further describing the structure of antennas used herein, some of the underlying theory will be treated.

When two fluids present in the NMR investigation region have different diffusion coefficients, the signals from the two fluids add in the spin echo. Thus, if there is a large difference in diffusion coefficients, it is possible to find a combination of pulse sequence parameters for which the contribution of the rapidly diffusing liquid is eliminated from the echo signal while the contribution from the slowly diffusing liquid is essentially unaffected. In a technique hereof, the relatively large difference between the diffusion coefficients of hydrocarbon and water (oil and water, or gas and water) is exploited in distinguishing the components of the NMR signal from hydrocarbon and from water.

Figure 7:
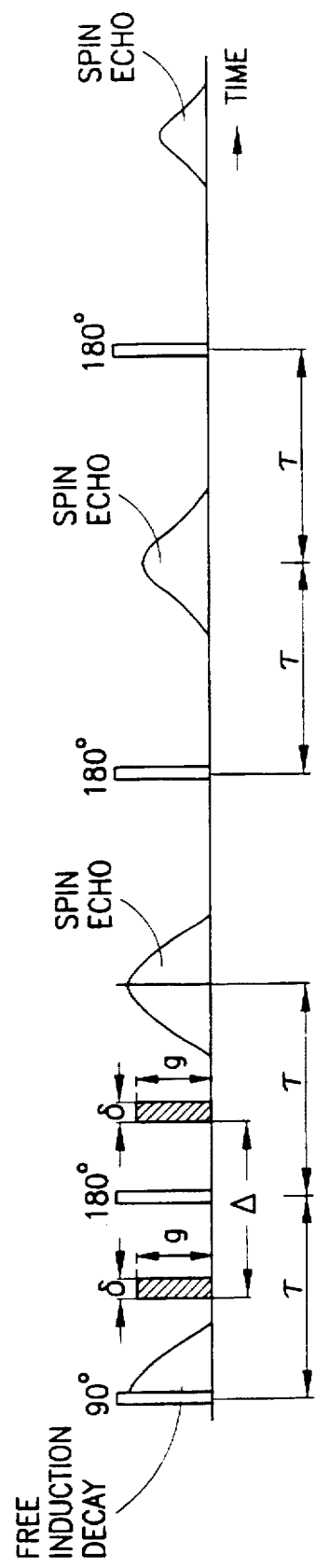
FIG. 7 is a diagram of an embodiment of a nuclear magnetic resonance pulse sequence used in an embodiment of the invention.

In an embodiment hereof, a pulse sequence that includes pulsed field gradients is used, and an example thereof is illustrated in FIG. 7. [Reference can also be made to U.S. Pat. No. 5,212,447 where it is proposed to use a pulse sequence with pulsed field gradients in determining a diffusion coefficient.] After the 90 degree tipping pulse and a gradient pulse, a 180 degree phase reversing pulse is applied (at time t) followed by another gradient pulse. The spin echo (after the rephasing to zero) occurs at time 2t. The 180 degree phase reversing pulses are then applied, in CPMG fashion, every $2\tau$ with spin echoes of successively lower amplitude occurring a time $\tau$ after each phase reversing pulse. The first three phase reversing pulses and the first three spin echoes are illustrated in the Figure, it being understood that there may be many more of each. In NMR notation, the pulse sequence is $$90\text{-}t_g\text{-}pfg\text{-}t_r\text{-}180\text{-}t_g\text{-}pfg\text{-}t_r\text{-}echo_1\text{-}|\tau_i\text{-}180\text{-}\tau_i\text{-}echo_{i+1}|_i \quad (5)$$

where $t_g$ is the time between the 90 degree pulse and the pulsed field gradient (about $t\text{-}\Delta/2$, in this example), pfg is the pulsed field gradient, $t_r$ is the time between the pulsed field gradient and the 180 degree reversing pulse (about $\Delta/2$, in this example), $echo_1$ is the first spin echo, and $\tau_i$ are Carr-Purcell spacings (times) for the subsequent 180 degree reversing pulses and echoes (i=1,2, ... ). The sequence will be referred to as a "PFG-CPMG" sequence. The initial echo strength can be represented as $$M = M_o \exp[-\gamma^2 g^2 \delta^2 l^2] \quad (6)$$

where $\gamma$ is the gyromagnetic ratio, g is the pfg amplitude, $\delta$ is the pfg pulse width, and $l^2$ is the mean square diffusion length $$l^2 = D\Delta(\Delta \gg \delta/3) \quad (7)$$

where D is the diffusion coefficient and $\Delta$ is the time between the gradient pulses. Therefore, equation (6) can be written as $$M = M_o \exp[-\gamma^2 g^2 \delta^2 D \Delta] \quad (8)$$

As previously noted, where two fluids are present which have different diffusion coefficients, the signals from the fluids add in the spin echo. Therefore, for oil and water, equation (8) would be $$M = V_{oil} \exp[-\gamma^2 \delta^2 g^2 D_{oil} \Delta] + V_w \exp[-\gamma^2 \delta^2 g^2 D_w \Delta] \quad (9)$$

where $V_{oil}$ is the volume fraction of oil, $V_w$ is the volume fraction of water, $D_{oil}$ is the diffusion coefficient of oil, and $D_w$ is the diffusion coefficient of water. However, in "Determining Oil and Water Saturations Without Determining Diffusion Coefficients," below, solutions to $V_{oil}$ and $V_w$ are discussed without using diffusion coefficients, which are uncertain, at best.

Figure 8A:
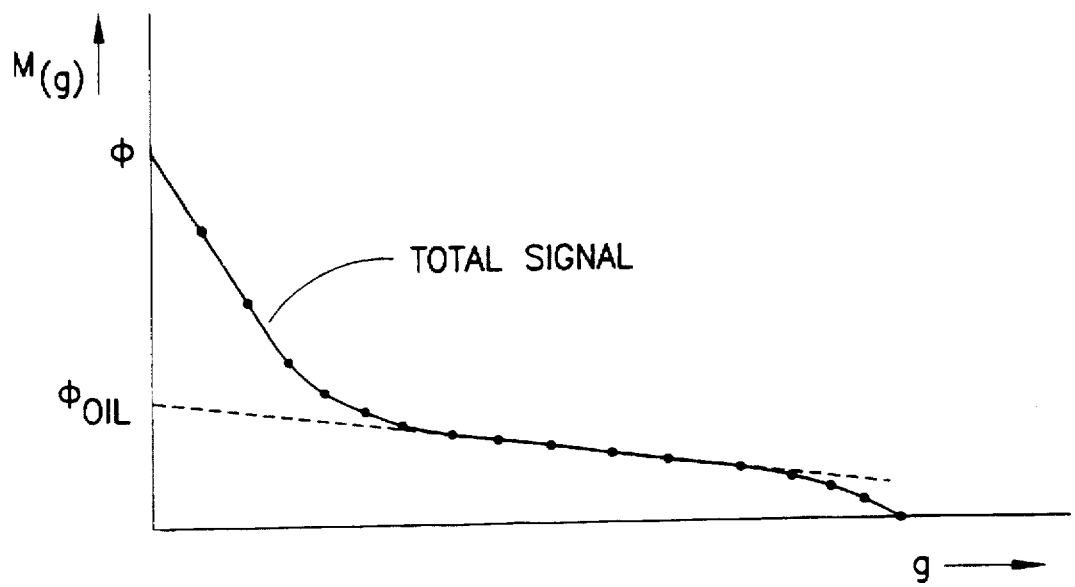
FIG. 8A is a diagram illustrating the type of nuclear magnetic resonance data, as a function of a pulsed gradient magnetic field variable, that is useful in understanding an embodiment of the invention.
Figure 8B:
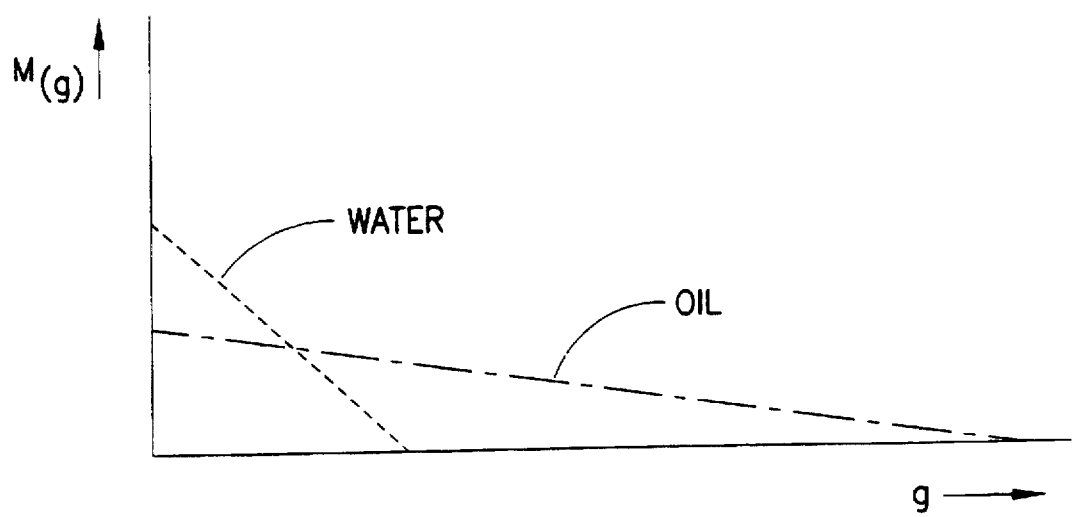
FIG. 8B shows curves that are useful in understanding FIG. 8A.

The values of initial echo strength M as a function of a gradient pulse parameter (again, g, $\delta$, and/or $\Delta$), can also be used to obtain $V_{oil}$ by using values of M that are affected almost exclusively by the oil component of the investigated formation region (and to the exclusion of the water component of the investigated formation region). As described above, a distinction can be based on the difference in diffusion coefficients between oil and water, so by selecting gradient pulse parameters that reduce or eliminate the signal from the more rapidly diffusing liquid (the water), one can use the signal from the oil to determine $V_{oil}$. FIG. 8A shows the shape of a typical data curve, with the points representing the initial echo strength M(g) for different values of gradient pulse amplitude, g, for a situation where oil and water are present in a sandstone. FIG. 8B illustrates why the Figure A curve has its characteristic shape, with two portions of different slope. In FIG. 8B, the higher slope curve, in dashed line, represents the M(g) vs. g characteristic for a substance (e.g. water) having a relatively high diffusion coefficient, and the lower slope curve, in broken dashed line, represents the M(g) vs. g characteristic for a substance (e.g. oil) having a relatively low diffusion coefficient. The total signal resulting from both substances will add, and result in a characteristic shape like that of FIG. 8A. Referring again to FIG. 8A, by using pulse sequences with values of g that result in data points on the shallower sloped portion of the curve (where the water component has little or no effect), the curve can be extrapolated, as shown in dotted line, to obtain a total signal value representative of the oil-filled porosity or the volume of oil, $V_{oil}$. At least two points, and preferably more, on the shallower sloped portion of the curve, can be used to establish the extrapolation line. The intercept of the line provides the volume of oil, and the slopes of the two portions respectively are proportional to the diffusion coefficients of the oil and the total of the liquids. The constant of proportionality may be unknown.

While FIGS. 8A and 8B illustrate curves for oil and water, it will be understood that, for example, water and gas will have curves with quite different slopes (in such case, a higher slope for gas, in which molecules diffuse much faster than in a liquid) and could be distinguished in similar manner. A three component (oil, gas, water) model could also be utilized.

Accordingly, the total signal resulting from two or more substances can be used to determine the volume of hydrocarbons in an earth formation. The total signal can be used in at least two ways: to directly indicate the volume of hydrocarbons as a log of the formation, and used in characterizing another parameter of the formation. Specifically, the signal could be used in interpretation techniques to more accurately indicate porosity, for example.

Figure 9:
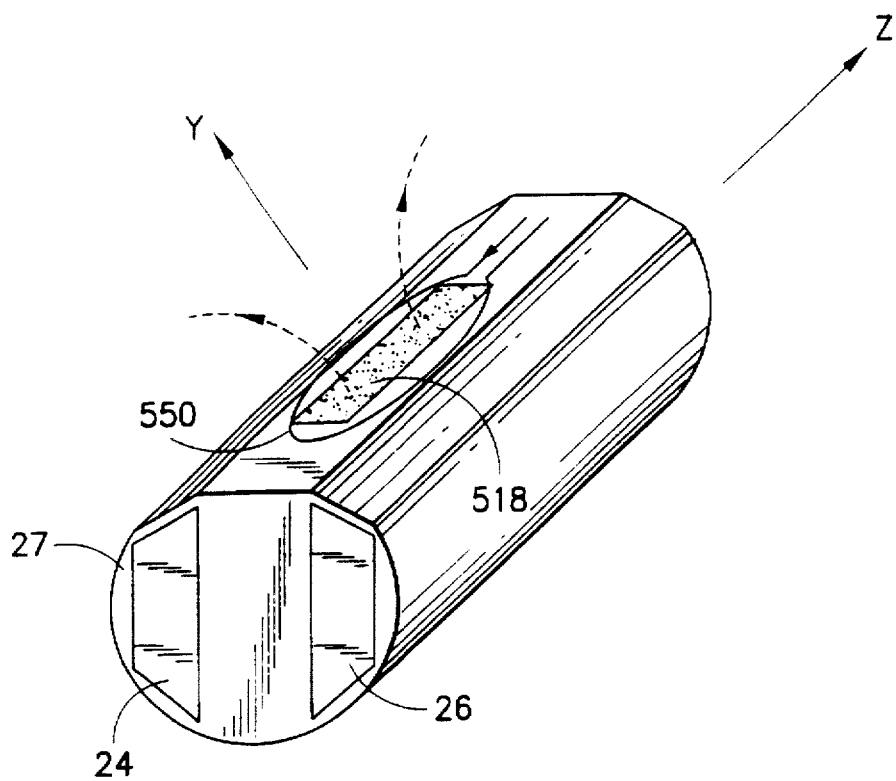
FIG. 9 is a perspective diagram of a portion of a logging device that includes an antenna for producing a magnetic field gradient in accordance with an embodiment of the invention.
Figure 10:
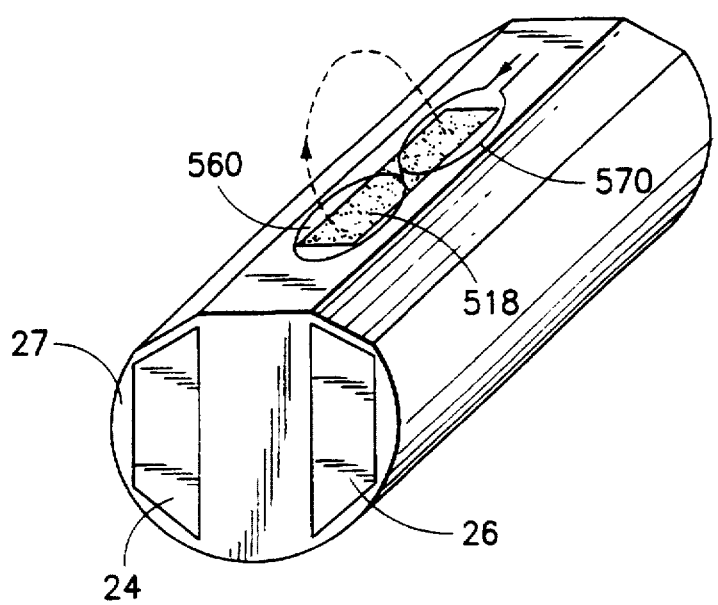
FIG. 10 is a perspective diagram of a portion of a logging device that includes an antenna for producing a magnetic field gradient in accordance with another embodiment of the invention.
Figure 11:
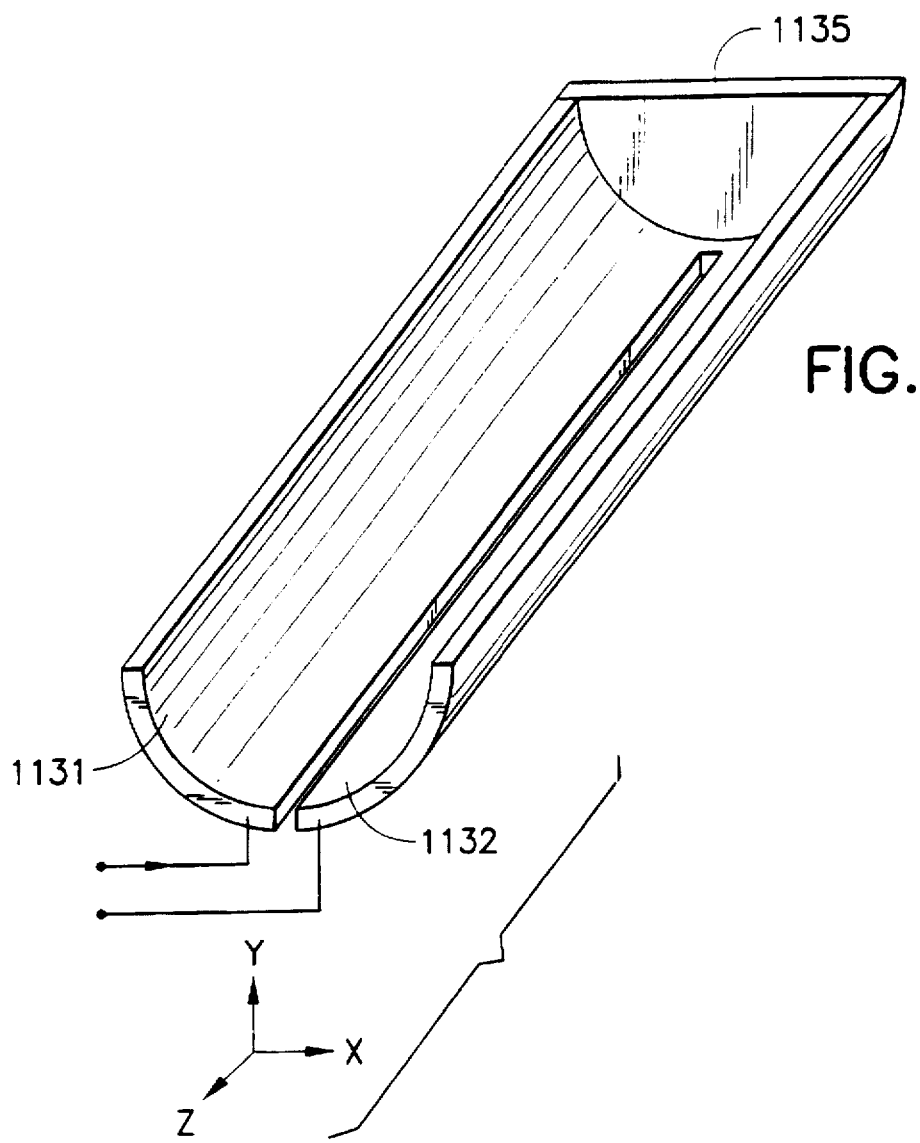
FIG. 11 is a perspective view of the shell of an RF antenna that has been modified so that its structure can also be used as an antenna for producing a magnetic field gradient.

Referring to FIGS. 9-11, there are shown embodiments of an antenna in a logging device that can be used to produce pulse field gradients. The logging device shown in FIG. 9 is of the general type described in U.S. Pat. Nos. 5,055,788 and 5,153,514, and illustrated in part in FIGS. 4-6. In FIGS. 9 and 10, the housing for the permanent magnets is shown at 27, the permanent magnets are shown at 24, 26, and the front face of RF antenna (18) is represented shaded at 518. In the embodiment of FIG. 9, the antenna for generating the magnetic field gradient is a coil 550 (of one turn or a plurality of turns), and the coil 550 is coupled with a current source power supply, as described in conjunction with FIG. 13. The antenna 550 can be wound in an insulating material (such as epoxy) and sandwiched between the front face of the magnet housing and a wear plate (not shown), which is formed of a non-magnetic non-metallic material, such as a heavy plastic, that is mounted on the front face of the logging device. A wear plate is described, for example, in U.S. Pat. No. 5,153,514. In operation, when a DC current is applied to the antenna 550, the magnetic field lines will be generally as indicated by dashed lines in the Figure. If the longitudinal axis of the borehole is considered as the z direction, and the direction the tool is facing is considered as the y direction (see coordinate axes in FIG. 9), then, in the investigation region, the gradient of the magnetic field for the FIG. 9 configuration will be dBy/dy; that is, the gradient will be in the radial direction with respect to the borehole axis. [The static field direction in the investigation region is the y direction, and the RF field direction in the investigation region is the x direction.]

In the embodiment of FIG. 10, two coils, 560 and 570 (each of one or more turns), are provided, and the coils are energized so that currents circulate therein in opposite directions, thereby resulting in magnetic field lines as represented in the Figure in dashed line. In this case, the magnetic field gradient in the investigation region will be dBy/dz. Again, these coils can be wound in an insulating medium that is sandwiched between the face of the logging device and a wear plate. It will be understood that the coil or coils could also be oriented to provide a magnetic field gradient dBy/dx in the investigation region.

Figure 12:
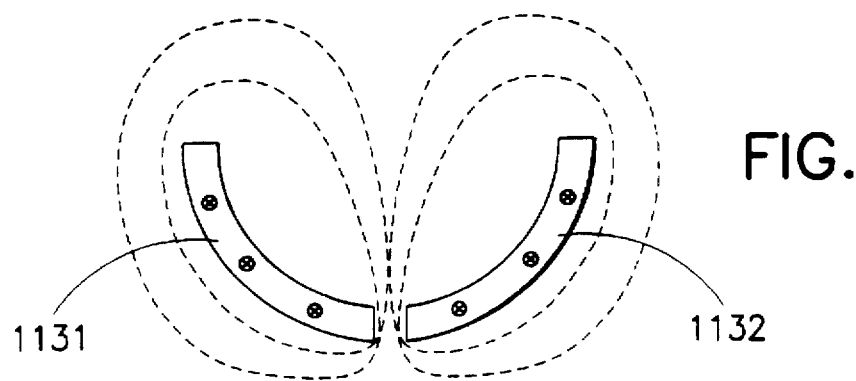
FIG. 12 is a cross-sectional view of the antenna shell of the FIG. 11 embodiment.

FIGS. 11 and 12 illustrate another embodiment of an antenna for producing the gradient magnetic field. In this embodiment, a modification of the RF antenna described in U.S. Pat. Nos. 5,055,788 and 5,153,514 is utilized so that the modified antenna can also produce the magnetic field gradient. FIG. 11 illustrates the modified RF antenna which is generally in the shape of a trough and, as disclosed in the referenced Patents, can be filled with a ferrite (not shown). As also described in the '514 Patent, the body of the antenna can have an inner conductive shell separated from the body (which can be formed of steel) by a rubber layer for suppression of magnetoacoustic ringing. In accordance with the modification hereof, the conductive trough is longitudinally split, as illustrated in FIG. 11, and the current source is applied across the two halves 1131, 1132. The other end of the split antenna is shorted, as represented by conductive end plate 1135. The current, which is illustrated in the cross-section of FIG. 12 as flowing into one of the halves of the body and out of the other, results in the type of magnetic field shown in dashed line. In this case, the magnetic field gradient in the investigation region is like that of the FIG. 9 embodiment, and can be designated dBy/dy.

Figure 13:
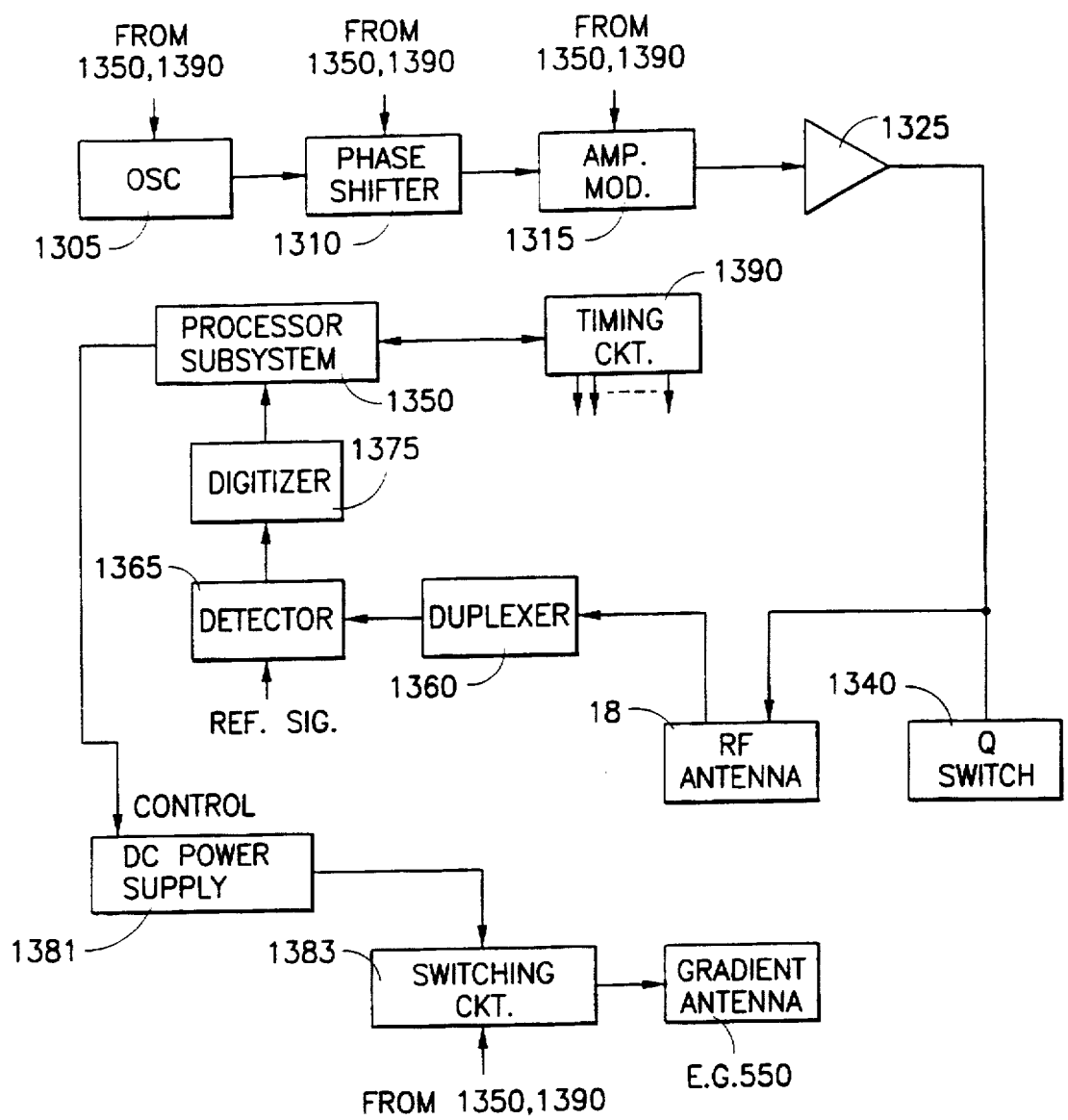
FIG. 13 is a block diagram of an embodiment of the electronics which can be used in practicing an embodiment of the invention.

FIG. 13 is a block diagram of electronics that can be utilized in embodiments of the present invention. The electronics can be located, for example, in the body 27 or in a separate cartridge or sonde. The electronics associated with the RF operation of the RF antenna 18 can be of the type described in U.S. Pat. No. 5,055,788, and reference can be made to the '788 Patent for further details. An oscillator circuit 1305 is provided, and the output thereof is coupled to a phase shifter 1310, which is under control of a timing circuit (represented at block 1390) which, in turn, is controlled by a processor subsystem, represented at 1350, to control the phase of signals output therefrom so that, in known manner, the signals used in forming the pulses such as the 90 degree and 180 degree pulses, can be generated. The processor subsystem 1350 may comprise, for example, a microprocessor with associated memory, clock, and input/output circuits (not separately shown). The output of phase shifter 1310 is coupled to an amplitude modulator 1315, which also operates under control of the timing circuit 1390 (which is, in turn, under control of the processor subsystem 1350). The amplitude modulator forms the pulse shapes as described in further detail in the U.S. Pat. No. 5,055,788. The output of amplitude modulator 1315 is coupled to a power amplifier 1325, the output of which is, in turn, coupled with the RF antenna 18. As described in the above-referenced U.S. Pat. No. 5,055,788, a Q-switch circuit 1340 is provided, and is also coupled with the RF antenna, to quickly damp any ringing. The RF antenna 18 is also coupled with receiving circuitry that includes a duplexer 1360 that operates to protect the receiver circuit from the high power signals during transmission. The output of the duplexer 1360 is coupled with a detector circuit 1365 that receives a reference signal which can be derived from the oscillator circuit, as is again described in the referenced '788 Patent. The detector circuit 1365 can be suitably gated. The output of the detector circuit 1365 is coupled to a digitizer circuit 1375 which is under control of the timing circuit, and the output of the digitizer circuit 1375 is coupled with the processor subsystem 1350.

FIG. 13 also shows a further portion of the electronics which is utilized in producing the gradient pulses in accordance with an embodiment hereof. A direct current source power supply 1381 is provided, and may be of the type sold by Techron Company of Elkhart, Ind. The output level of the current source is controlled by processor subsystem 1350. The output of the DC current source 1381 is coupled to the gradient antenna, e.g. an antenna as shown in FIGS. 9–11, via a switching circuit 1383 that is controlled by the processor subsystem 1350, via timing circuit 1390. In operation, the processor subsystem 1350, programmed in accordance with the flow diagrams described below, controls the transmitter circuitry of the electronics to apply the transmitter signals to the RF antenna, to apply gradient pulses to the PFG antenna(s), and to activate the receiver portion of the electronics to detect and process the spin echoes received by the RF antenna.

Figure 14:
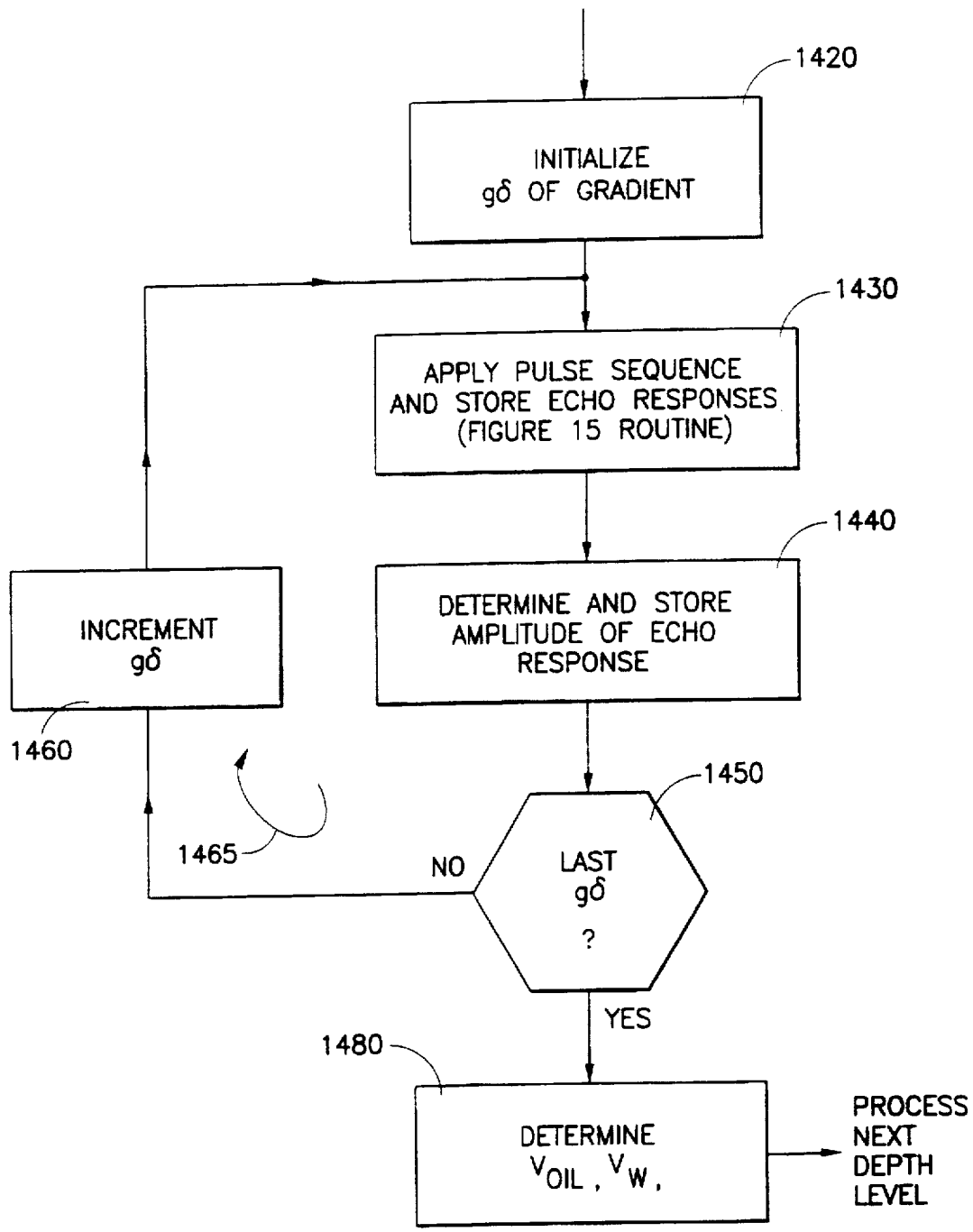
FIG. 14 is a flow diagram of a routine for controlling a processor subsystem in accordance with an embodiment of the invention.

Referring to FIG. 14, there is shown a routine for controlling a processor, such as the processor subsystem of FIG. 13 and/or, in part, an uphole processor in equipment 7, in accordance with an embodiment of the invention. In the routine of FIG. 14, one or more parameters of the gradient pulses (for example, the amplitude g and/or the gradient pulse duration $\delta$) is varied in order to affect the rapidity of dephasing and rephasing (e.g. of diffusing spins). The time integral of the gradient pulse is approximately $g\delta$, and it is this product that is varied in the present embodiment (by varying g, $\delta$, or both). The block 1420 represents the initializing of $g\delta$ to a starting value. The pulse sequence of FIG. 7 is then applied, and the detected spin echoes stored, as represented by the block 1430. The routine represented by the block 1430 is described in conjunction with FIG. 15, and reference will be made for the moment to the FIG. 15. As shown therein, the block 1505 represents application of a 90 degree pulse, using control of the transmitting circuitry as previously described in conjunction with FIG. 13. After a wait of $t_g$ (block 1510), the first gradient pulse is applied, using processor control of the circuitry of FIG. 13 to energize the gradient coil (as represented by the block 1525). After a time $t_r$ (block 1530) a 180 degree reversing pulse is applied (again, using the transmitter circuitry of FIG. (13), as represented by the block 1540). After a wait of $t_g$ (block 1545), the second gradient pulse is applied (block 1550). The circuitry of FIG. 13 is then switched to a receiving mode (as represented by the block 1560) for detection and storage of the spin echo. As described, for example in the above-referenced U.S. Pat. No. 5,023,551, one can detect and store the peak of the spin echo, the area under the spin echo, or both. A reversing pulse index is initialized, as represented by the block 1565. Inquiry is then made (decision block 1570) as to whether the last 180 degree reversing pulse has been transmitted; i.e., whether the reversing pulse index has reached its maximum value. If not, the reversing pulse index is incremented (block 1575) and, after a wait time $\tau$ (block 1580—the total wait time of $2\tau$, since previous 180 degree pulse), the next 180 degree reversing pulse is applied (block 1585), followed by switching to the receiving mode for detection and storage of the next spin echo (block 1590). The decision block 1570 is then reentered, and the loop 1595 is continued until the predetermined number of 180 degree reversing pulse transmissions and spin echo detections have been implemented, whereupon the block 1440 of FIG. 14 is entered.

Referring again to FIG. 14, the block 1440 represents the determination and storage of the first spin echo magnitude (or area, as the case may be) from the stored sequence of spin echoes. Briefly, the amplitude of the first echo is determined by generating the exponential components (Laplace transform coefficients) of the spin echoes and then summing the coefficients to effectively extrapolate to obtain the first echo amplitude. This type of extrapolation is well known, and reference can be made, for example, to Butler et al., "Estimating solutions Of First Kind Integral Equations With Non-Negative Constraints And Optimal Smoothing", SIAM Journal of Numerical Analysis, Vol. 18, No. 3, June, 1981. The decision block 1450 is then entered, and inquiry is made as to whether the last variation of the gradient pulse area ($g\delta$) has been reached. If not, $g\delta$ is incremented (block 1460), such as by incrementing g, and the block 1430 is reentered. The loop 1465 then continues until the last value of $g\delta$ has been reached, whereupon the block 1480 is entered. This block represents the determination of $V_{oil}$ from the initial spin echo amplitudes (or areas) previously determined in terms of the diagram of FIG. 8, by using values of g that result in data points on the curve, and then interpolating to obtain $V_{oil}$. Also, as previously described, values for $V_{oil}$, $V_w$, can be obtained by simultaneous solution for several values of M as a function of g. Processing can then be implemented for the next depth level.

Figure 16A:
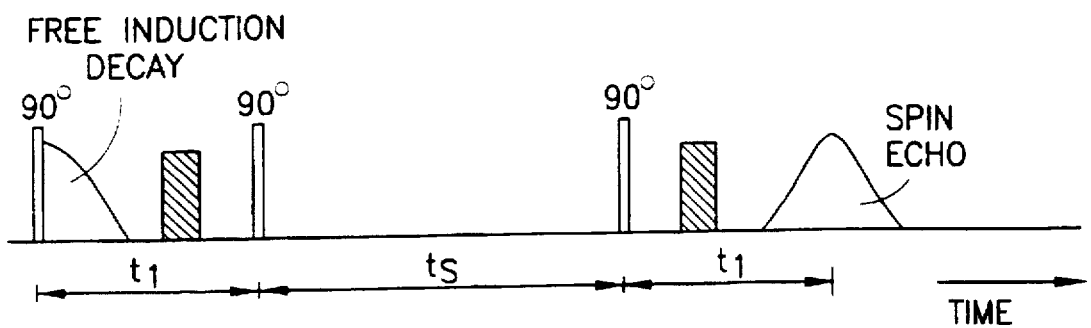
FIG. 16A and 16B are diagrams of further nuclear magnetic resonance pulse sequences.
Figure 16B:
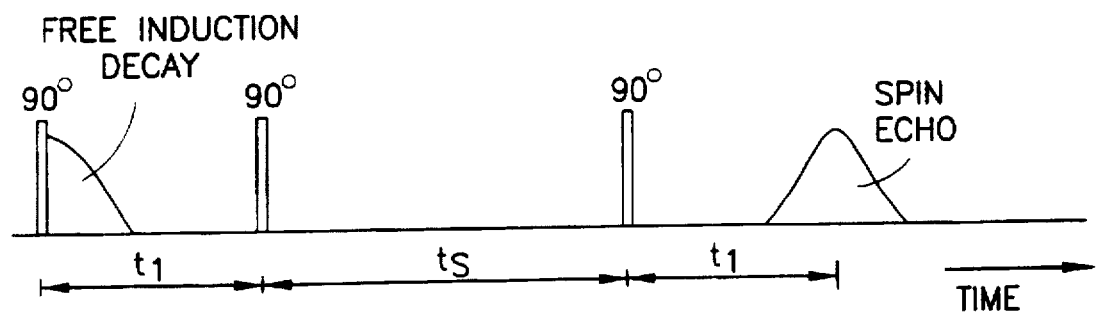

A so-called "stimulated echo" sequence can be used in practicing an embodiment of the invention. Stimulated echo has been used in laboratory measurement of materials for many years. [See, for example, Tanner, "Use Of The Stimulated Echo In NMR Diffusion Studies", Journal Of Chemical Physics, Vol. 52, No. 5, March 1970, and, more recently, Latour et al., "Improved PFG Stimulated Echo Method For The Measurement Of Diffusion In Inhomogeneous Fields", Journal Of Magnetic Resonance, Ser. B. Vol. 101, February, 1993, and Latour et al., "Time-Dependent Diffusion Coefficient of Fluids in Porous Media as a Probe of Surface-to-Volume Ratio", Journal of Magnetic Resonance, Series A. Vol. 101, February, 1993. See also U.S. Pat. No. 5,212,447, where it is proposed to use a stimulated echo sequence in determining a diffusion coefficient.] An example of a stimulated echo pulse sequence, as in Latour et al., is shown in FIG. 16A. The typical 90 degree pulse is applied to tip the spins into the transverse plane. The spins can now be affected by magnetization decay; e.g., from small gradients in the static magnetic field. After a time $t_1$ (which is typically much smaller than diffusion time to be measured) another 90 degree pulse is then used to orient the spins in a direction parallel to the static field. The spins can be thought of as being "stored", since they are in the $B_0$ direction, so they do not precess, and are not affected by the magnetic field gradient. After a period of time, $t_S$, another 90 degree pulse is provided, and this tips the spins back into the transverse plane. Now, the spins behave as though the two latest 90 degree pulses had been a 180 degree reversing pulse, and rephasing begins, so that an echo is obtained after a time which corresponds to the time ($t_1$) between the first two 90 degree pulses. Since diffusion was not suspended during the time that the spins were "stored", the echo will be responsive to diffusion effects. Accordingly, relatively long diffusion times can be measured in the presence of a moderate magnetic field gradient. This is because spins that have not moved a substantial distance in the magnetic field gradient will contribute to the echo (since they will not readily decay during the time they are in "storage"), whereas spins that have moved substantially to a different location in the static magnetic field will not rephase and contribute to the echo. In FIG. 16A, pulsed field gradients are shown during the $t_1$ intervals, as used in Latour et al., supra. FIG. 16B illustrates the sequence without pulsed field gradients, for use when sufficient magnetic field gradient is present without them. After the first spin echo, subsequent cycles of phase reversal and echo can be implemented, as was illustrated above in FIG. 7, and is represented in FIG. 16B.

Figure 17:
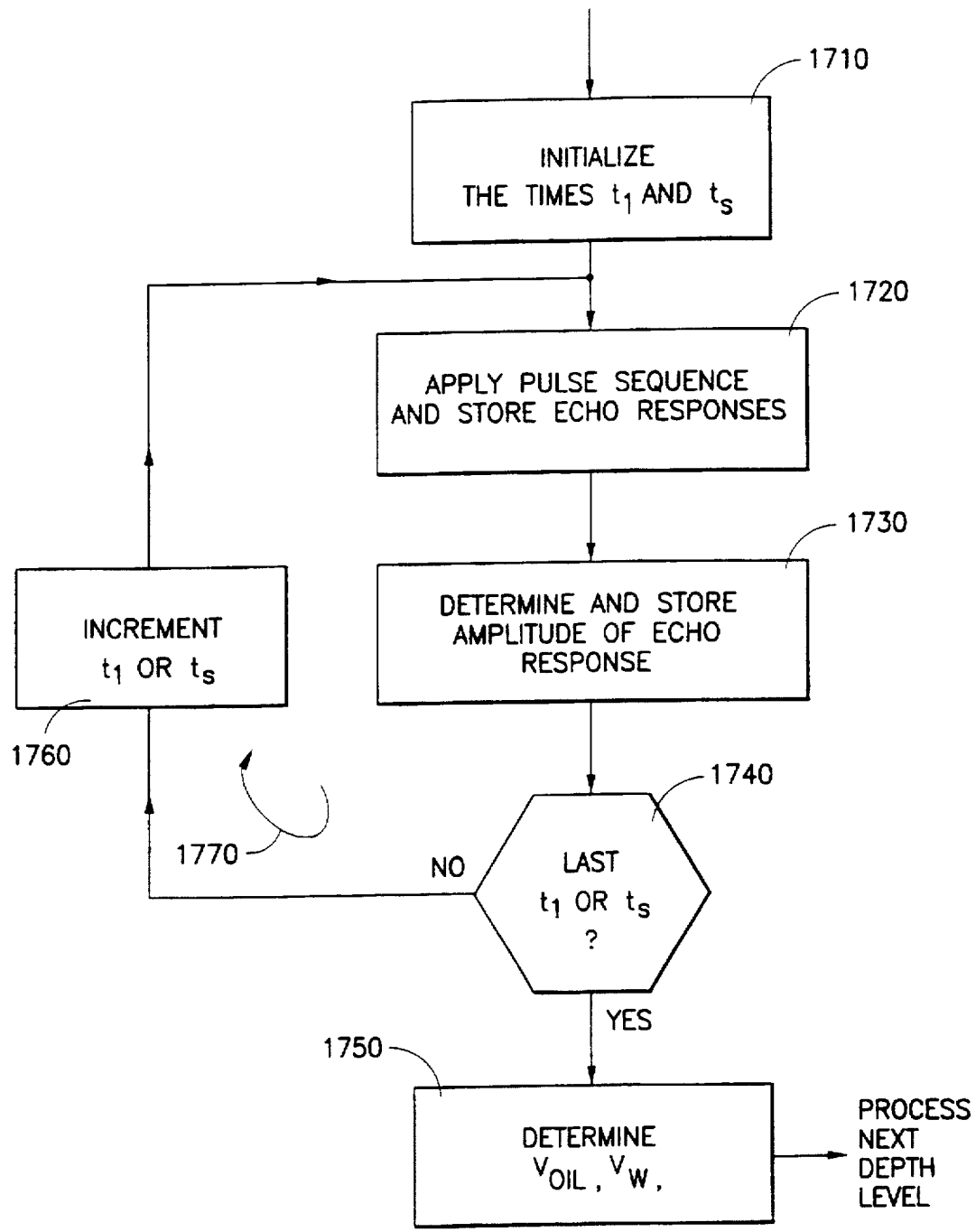
FIG. 17 is a flow diagram of a routine that can be used for controlling a processor subsystem in accordance with a further embodiment of the invention.

FIG. 17 is a flow diagram of a routine for controlling the processor subsystem using a pulse sequence of the type shown in FIG. 16B. In the routine of FIG. 17, the time $t_1$ or the time $t_S$ (or both) is varied in order to vary the effective diffusion time. The block 1710 represents the initializing of the times $t_1$ and $t_S$. The pulse sequence of FIG. 16B is then applied, and the detected spin echoes stored, as represented by the block 1720. The routine represented by the block 1720 is described in conjunction with FIG. 18, and reference will be made for the moment to the FIG. 18. As shown therein, the block 1805 represents application of a 90 degree pulse, using control of the transmitting circuitry as previously described in conjunction with FIG. 13. After a wait of $t_1$ (block 1810), another 90 degree pulse is applied, as represented by the block 1815. Then, after a wait $t_S$ (block 1820), another 90 degree pulse is applied, as represented by the block 1830. The circuitry of FIG. 13 is then switched to a receiving mode (as represented by the block 1850) for detection and storage of the spin echo. As noted above, one can detect and store the peak of the spin echo, the area under the spin echo, or both. If only a single echo is used, return to block 1730 of FIG. 17 can then be implemented. If further spin echoes are to be produced and detected in the pulse sequence, a reversing pulse index is initialized, as represented by the block 1865. Inquiry is then made (decision block 1870) as to whether the last 180 degree reversing pulse has been transmitted; i.e., whether the reversing pulse index has reached its maximum value. If not, the reversing pulse index is incremented (block 1875) and, after a wait time $\tau$ (block 1880), a 180 degree reversing pulse is applied (block 1885), followed by switching to the receiving mode for detection and storage of the next spin echo (block 1890). The decision block 1870 is then re-entered, and the loop 1895 is continued until the predetermined number of 180 degree reversing pulse transmissions and spin echo detections have been implemented, whereupon the block 1730 of FIG. 17 is entered.

Referring again to FIG. 17, the block 1730 represents the determination and storage of the amplitude or area (as the case may be) of the echo response from the one or more spin echoes, as above. The decision block 1740 is then entered, and inquiry is made as to whether the last value of $t_1$ or $t_S$ has been reached. If not, $t_1$ or $t_S$ is incremented (block 1760), and the block 1720 is reentered. The loop 1770 then continues until the last value of $t_1$ or $t_S$ has been reached, whereupon the block 1750 is entered. As described above, this block represents the determination of $V_{oil}$ from the echo amplitude response previously determined. Again, for example, simultaneous equations or an extrapolation technique can be used. In FIG. 8A, the horizontal axis can be the diffusion time. As also previously described, values for $V_w$ and can also be obtained. Processing can then be implemented for the next depth level.

Figure 18:
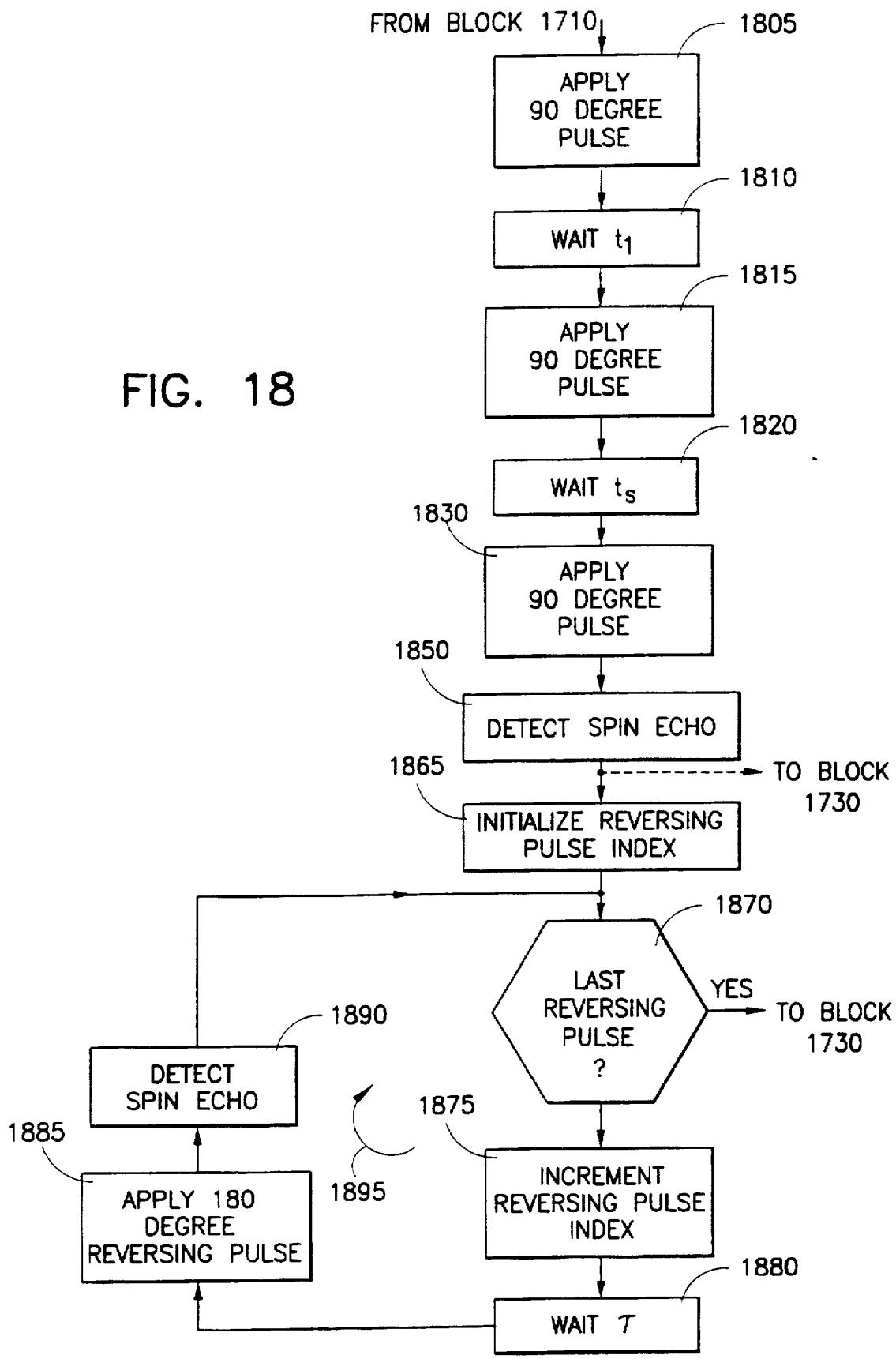
FIG. 18 is a flow diagram of a routine represented by a block of the FIG. 17 routine, for applying a pulse sequence and storing echo responses.

In employing the techniques described in conjunction with FIGS. 16–18, it will be understood that other types of logging devices, for example the type described in copending U.S. patent application Ser. No. 08/041,643, assigned to the same assignee as the present invention, can be used, if desired, and can provide relatively larger constant magnetic field gradients.

In the foregoing techniques, a magnetic field gradient is used to advantage in obtaining spin echoes that contain useful information about diffusion properties of the formation fluids. In addition to the gradients that can be applied by the apparatus, there are magnetic field gradients within porous media. The magnitude of these gradients is approximately $$G = \frac{3\Delta\chi_v B_o}{R} \quad (10)$$

where $\Delta\chi_v$ is the difference in volumetric magnetic susceptibility between the grain material and the pore fluid, R is a size characterizing the pore geometry, and $B_o$ is the magnitude of the static field applied by the apparatus [L. E. Drain, "The Broadening of Magnetic Resonance Lines Due to Field Inhomogeneities in Powdered Samples", Proceedings of the Physical society, 80,1380 (1962); J. A. Glasel, K. H. Lee, "On the Interpretation of Water Nuclear Magnetic Resonance Relaxation Times in Heterogeneous System", Journal of American Chemical Society 96,970 (1974)]. In rocks these gradients can be roughly a few G/cm when the static magnetic field is around 500 Gauss. Internal gradients contribute to the attenuation of signals from rapidly diffusing species [E. O. Stejskal, J. E. Tanner, "Spin Diffusion Measurements: Spin Echoes in the Presence of a Time-Dependent Field Gradient", Journal of Chemical Physics, 42,288 (1965)]. For the Stejskal-Tanner sequence, the echo strength for a species with a diffusion coefficient D is $$A(2\tau) = A(0)\exp\left[-\gamma^2 D \left\{ \frac{2}{3}\tau^3 G_0^2 + \delta^2\left(\Delta - \frac{\delta}{3}\right)G^2 \right\}\right] \times$$
$$\exp\left[-\gamma^2 D \left\{ -G_0 \cdot G \left[\delta(t_1^2 + t_2^2) + \delta^2(t_1 + T_2) + \frac{2}{3}\delta^3 - 2\delta\tau^2\right]\right\}\right]$$

In this equation $G_o$ is the internal gradient, which in a simple model is given by equation (10), $t_1$ is the time between the initial 90 pulse and the start of the first gradient pulse, and $t_2$ is the time from the end of the second gradient pulse to the center of the echo. Other symbols were defined in connection with equation (3).

Figure 20:
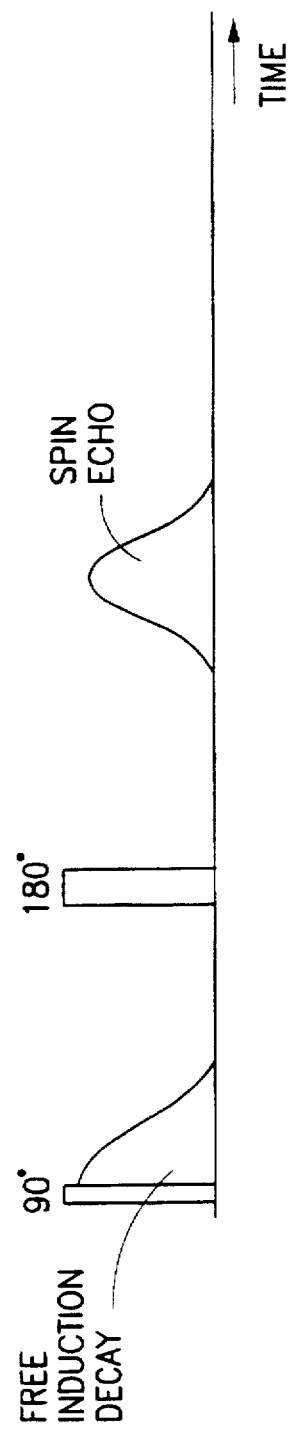
FIG. 20 is a diagram of a Hahn nuclear magnetic resonance pulse sequence.

If the internal gradients are large enough, pulse gradients are not needed for diffusion editing. A Hahn spin echo sequence [E. L. Hahn, "Spin Echoes", Physical Review 80,580 (1950)] can be used. This sequence is shown in FIG. 20. The echo is attenuated according to $$A(2\tau) = A(0)\exp\left[-\frac{2}{3}\gamma^2 DG_0^2\tau^3\right] \quad (12)$$

so incrementing $\tau$ will quickly destroy the signal from a rapidly diffusing species, if the internal gradient is sufficiently large.

Figure 19:
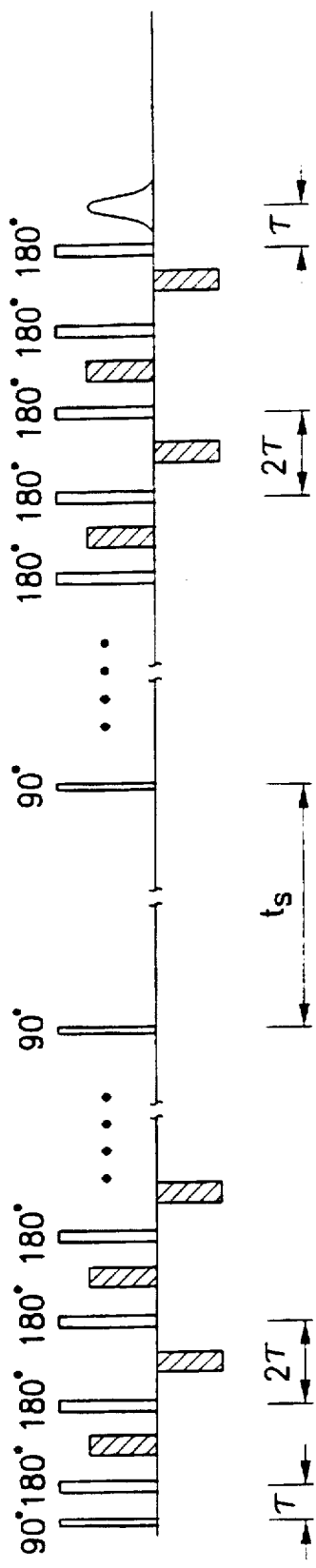
FIG. 19 is a diagram of a nuclear magnetic resonance pulse sequence that can be used in a further embodiment of the invention.

If internal gradients in formations being logged are substantial, a technique of using a pulse sequence with pulsed field gradients of alternating polarity can be utilized to reduce or substantially eliminate the effect of internal gradients in the formations. In the FIG. 13 embodiment, the switching circuit 1383 can be operative, under control of processor subsystem 1350, to reverse the polarity of the current applied to the coil or coils of FIGS. 9–12 for certain gradient field pulses of the pulse sequence. A pulse sequence can be used that is of the type described in Latour et al., "Time-Dependent Diffusion Coefficient Of Fluids In Porous Media As A Probe Of Surface-To-Volume Ratio", Journal Of Magnetic Resonance, Ser. A 101, 342–346, February, 1993. Reference can also be made to Latour et al., "Improved Pulse Field Gradient Stimulated Echo Method For The Measurement Of Diffusion In Inhomogeneous Fields", Journal Of Magnetic Resonance, Ser. B. Vol. 101, 72–77, February, 1993, and to R. M. Cotts et al., "Pulsed Field Gradient Stimulated Echo Methods For Improved NMR Diffusion Measurements In Heterogeneous Systems", Journal Of Magnetic Resonance, Vol. 83, 252, June, 1989. As described in these publications, when using a pulse sequence that has 180 degree pulses followed by gradient pulses that alternate in polarity, the effects of internal gradients in laboratory samples tend to cancel out. In the present embodiment, the effects of internal gradients in earth formations are reduced or eliminated by employing the gradient field coils to implement pulses of alternating polarities as part of the type of pulse sequence illustrated in FIG. 19. In the example of FIG. 19, the time between the initial 90 degree tipping pulse and the first 180 degree reversing pulse is τ, and the time between subsequent 180 degree pulses is 2τ. The gradient pulses are evenly spaced between the 180 degree pulses, and have alternating polarities. In this example, after the initial sequence (which is illustrated as including two pairs of gradient pulses, but may include several more or many more), a 90 degree pulse is used, in the manner of the FIG. 16 example, to achieve a "stimulated echo" type of operation, where the spins are "stored" in the direction of the static field for a time $t_s$. After a further 90 degree pulse to take the spins out of the "stored" state, the initial sequence is repeated, and the spin echo, at a time τ after the final 180 degree pulse, is received and processed. If desired, a CPMG sequence may be appended to this pulse sequence to repeatedly refocus the first echo. In this manner, a more precise estimate of the amplitude of the first echo may be obtained, as described above.

The invention can be implemented with an NMR wireline tool suspended from a cable into a borehole. See U.S. Pat. No. 5,055,787 to Kleinberg et al., for example. The invention can also be implemented with an NMR logging-while-drilling tool mounted to a drill string in a borehole. See U.S. patent application Ser. No. 07/922,254 to Kleinberg, et al., for example. With either type of tool, the pulse sequence can be altered as describe in this application. Also, each tool could house two sets of magnets, RF coil, etc. for separately performing NMR measurements, each set operating at a pulse sequence which is different from the other. Additionally, two tools of one type could be connected in series such that one tool in the series operates at a pulse sequence which is different from that of the other tool.

Determining Oil and Water Saturations without Determining Diffusion Coefficients One of the most important potential applications of nuclear magnetic resonance (NMR) logging is the determination of the volumes of gas, oil, and water in the flushed zone described above.

U.S. Pat. No. 5,212,447 to Paltiel alludes to determining various petrophysical quantities from NMR data. All these methods require the determination of a diffusion coefficient. The computation of a diffusion coefficient is problematic for a number of reasons. In order to compute a diffusion coefficient from static field gradient NMR data, it is necessary to know the strength of the static magnetic field gradient. In some borehole logging tools, permanent magnets create a field that is very nonuniform in space and has no single well-defined magnetic field gradient. In order to compute a diffusion coefficient from pulsed field gradient data, the time integrals of the magnetic field gradient pulses are required. Knowledge of the time integrals may require one or more of the following: components and circuits which are very stable with respect to variations of temperature, extra calibration procedures, or extra sensors to measure the time integral of the gradient pulses during borehole measurements. These requirements increase the cost of the tool, or increase the time required for downhole measurements.

The inventors, however, have discovered how to avoid these uncertainties. It is not necessary to find the diffusion coefficient in order to determine gas, oil, or water saturations from nuclear magnetic resonance logging tool data. The method described here requires that at least one pulse sequence parameter be increased by known multiplicative factors during the measurement cycle. However, no absolute knowledge of pulse sequence or tool parameters is required.

In the following development, it is shown how to solve for the quantities $V_{oil}$, $V_w$, and $V_g$, the volumes of oil, water and gas, respectively, in the formation. These quantities may also be expressed in terms of porosity and fluid saturations:

$$V_{oil} = \alpha \Phi S_o HI_o \quad (13)$$

$$V_w = \alpha \Phi S_w HI_w \quad (14)$$

$$V_g = \alpha \Phi S_g HI_g \quad (15)$$

α is a tool calibration constant, Φ is the porosity of the formation, $S_o$, $S_w$ and $S_g$ are the saturations of oil, water and gas, respectively, and $HI_o$, $HI_w$ and $HI_g$ are the hydrogen indices of oil, water and gas, respectively.

Discussed above are a number of ways to use contrasting diffusions to quantify oil, water, and gas in the zone of investigation of NMR tools. In the following, the determination of $V_{oil}$ and $V_w$ is demonstrated. The same technique can be used for any mixture of two fluids in the earth formation, for example water/gas or oil/gas.

A representative equation is:

$$M_1 = V_{oil} \exp(-\gamma^2 \delta^2 g^2 D_{oil} \Delta) + V_w \exp(-\gamma^2 \delta^2 g^2 D_w \Delta) \quad (16)$$

where $M_1$ is the signal level resulting from the application of a pulse sequence with parameters δ, g, and Δ; the symbols are explained earlier. For concision this may be rewritten as $$M_1 = V_{oil} A + V_w B \quad (17)$$

Consider a second measurement, in which one of the following changes is made: (1) δ is increased by a factor of √2; (2) g is increased by a factor of √2; or (3) Δ is increased by a factor of 2. Then the result of this second measurement is $$M_2 = V_{oil} A^2 + V_w B^2 \quad (18)$$

Combining equations (17) and (18), and adopting the definition $M_0 = V_{oil} + V_w$, we can express A and B in terms of the measurements $M_1$ and $M_2$, and the petrophysical quantities of interest $V_{oil}$ and $V_w$:

$$A = \frac{M_1}{M_0} \mp \left( \frac{V_w}{V_{oil}} \right)^{1/2} \left[ \frac{M_2}{M_0} - \frac{M_1^2}{M_0^2} \right]^{1/2} \quad (19a)$$

$$B = \frac{M_1}{M_0} \pm \left( \frac{V_{oil}}{V_w} \right)^{1/2} \left[ \frac{M_2}{M_0} - \frac{M_1^2}{M_0^2} \right]^{1/2} \quad (19b)$$

Note that the Equations (19a) and (19b) utilize opposite signs between the two terms. The choice is made such that A,B>0, and depends of the ratio $V_{oil}/V_w$.

Consider now a third measurement, in which a number m, not equal to 1 or 2, is selected, and one of the following changes is made relative to the values used in the first measurement: (1) δ is increased by a factor of √m; (2) g is increased by a factor of √m; or (3) Δ is increased by a factor of m. Then the result of this third measurement is $$M_3 = V_{oil} A^m + V_w B^m \quad (20)$$

Similarly a fourth measurement is made, in which a number n, not equal to 1, 2, or m, is selected and one of the following changes is made relative to the values used in the first measurement: (1) δ is increased by a factor of √n; (2) g is increased by a factor of √n; or (3) Δ is increased by a factor of n. Then the result of this fourth measurement is $$M_4 = V_{oil} A^n + V_w B^n \tag{21}$$

Equations (20) and (21) are two equations in two unknowns, $V_{oil}$ and $V_w$. In general, these equations cannot be solved analytically. However, they can be solved numerically.

Combination with Other Measurements

The above procedure can be simplified if other borehole measurements are made on the same formation. If the temperature, pressure and fluid compositions are known, the hydrogen indices can be readily computed [see e.g. Schlumberger Log Interpretation Principles/Applications (1987)]. If the porosity is known from another measurement, the following relationship is useful:

$$S_o + S_w + S_g = 1 \tag{22}$$

Thus in the example where only oil and water are present ($S_g = 0$) the above equations can be considerably simplified, and only three measurements are required.

Three Fluids Present

The presence of three fluids complicates the above analysis. The $m^{th}$ measurement can be described by the equation $$M_m = V_{oil} A^m + V_w B^m + V_g C^m \tag{23}$$

To solve for $V_{oil}$, $V_w$ and $V_g$ in the absence of other log information, it is necessary to make six measurements. Each measurement is characterized by an unique factor m, which need not be an integer, such that one of the following is true: (1) δ is increased by a factor of √m; (2) g is increased by a factor of √m; or (3) Δ is increased by a factor of m. The result is solvable using six equations and six unknowns, A,B,C. $V_{oil}$, $V_w$ and $V_g$. Only the last three are of interest, as A, B, and C are functions of tool and pulse sequence parameters. The tool and pulse sequence parameters may be difficult or expensive to determine.

We present pulsed NMR sequences that collect information faster than previously known measurement protocols. We show that neither the ability to pulse the field gradient nor its spatial uniformity are essential.

Nuclear magnetic resonance with pulsed field gradients, discussed above, is a technique for observing molecular diffusion. The basic principle of this measurement is as follows: The rate of nuclear precession is proportional to the strength of the applied static field. If the static field is position dependent, the rate of precession, hence the phase angle of precession after a duration δ, is position dependent, i.e., the position of a spin is encoded in its phase angle of precession. Suppose we invert (multiply by −1) the phase of precession by an RF pulse sequence (such as in the Hahn spin echo) and let the spins precess in the same inhomogeneous field for the same duration δ, thus reversing the phase encoding. At the end of this period, had the spins remained stationary, the phase of each spin would be the same. This is the principle of the Hahn spin echo. A nuclear spin in motion observes different field strengths (precession rates) during forward and reverse phase encoding. Therefore, its phase of precession attains a shift that is proportional to the inner product of the field gradient and the displacement of the spin between the forward and reverse phase encoding. Bulk motion of the sample leads to a phase shift in the total NMR signal; however, molecular diffusion causes each nuclear spin to have a random phase, which leads to a reduction in the signal amplitude.

NMR measurements are notorious for their low signal to noise ratios. Diffusion measurements might further aggravate the situation since diffusion is observed via a reduction in the NMR signal. It is therefore imperative to develop pulse sequences that gather diffusion information as efficiently as possible.

The pulse sequences we shall describe are relevant to an NMR apparatus that can subject the specimen to pulses of RF magnetic field perpendicular to a strong static magnetic field with a spatial gradient. Again, the frequency of the RF magnetic field is $\gamma B_o$, where $B_o$ is the magnitude of the static magnetic field and $\gamma = 2.675 \times 10^4$ radian/second/Gauss is the gyromagnetic ratio for protons. For example, an apparatus relevant to this application is described in U.S. Pat. Nos. 5,055,787 and 5,055,788, 8 Oct. 1991. The static field gradient produced by this apparatus is nonuniform in the specimen. The nonuniformity of the gradient introduces a surmountable complication in the NMR measurement. The ability to pulse or otherwise modulate the gradient of the static field is not necessary.

Notation for Pulse Sequences

In our notation, a $90°_x$ RF pulse effects a 90° nutation about the x axis in the rotating frame [Farrar and Becker, Fourier Transform and Pulse NMR, Academic Press]. This means, the RF pulse is such that $\gamma B_1 t/2 = \pi/2$ where t and $B_1$ are the duration and amplitude of the RF magnetic field in the specimen. The subscript of $90°_x$ refers to the phase shift applied to the RF pulse: the subscripts x, y, and −x correspond to 0, 90°, and 180° phase shifts. The phase shift determines the direction of the RF pulse in the rotating frame. In the figures, we schematically denote the RF pulses by vertical lines. They are typically 1 to 100 μs-wide pulses containing several cycles of the RF field.

Figure 21:
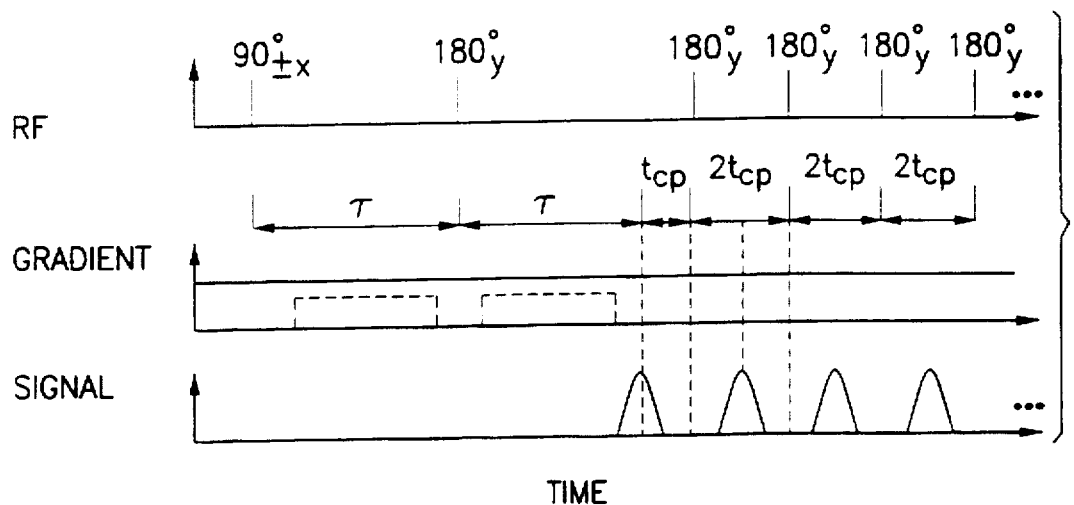
FIG. 21 shows a CPMG sequence modified to determine diffusion.
Figure 22:
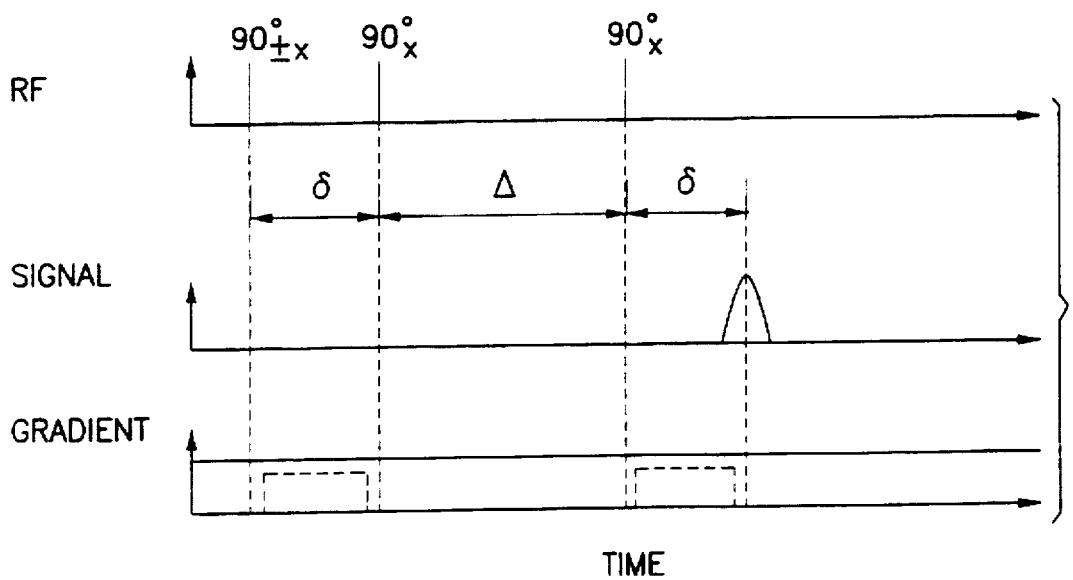
FIG. 22 shows Stimulated Echo (STE)

Phase Alternation: The first pulse in the sequences shown in FIGS. 21 to 23, $90°_{\pm x}$, indicates that the entire sequence is to be performed first by a $90°_x$ pulse and then with a $90°_{-x}$ pulse. All measurements performed in the latter sequence are to be subtracted from their counterparts in the former sequence. This operation (phase alternation) cancels instrument base line and most of the noise and spurious spin echoes produced by the RF pulses [A. Sezginer, R. L. Kleinberg, M. Fukuhara, and L. L. Latour, 'Very Rapid Simultaneous Measurement of Nuclear Magnetic Resonance Spin-Lattice Relaxation Time and Spin-Spin Relaxation Time,' Journal of Magnetic Resonance, Vol. 92, p. 504–527, 1991; R. L. Kleinberg, A. Sezginer, and M. Fukuhara, 'Nuclear Magnetic Resonance Pulse Sequences for use with Borehole Logging Tools,' U.S. Pat. No. 5,023,551, Jun. 11, 1991].

CPMG Sequence

The apparent relaxation rate observed by the Carr-Purcell-Meiboom-Gill (CPMG) sequence in bulk liquids has two components: spin-spin relaxation and diffusion.

$$\left(\frac{1}{T_2}\right)_{apparent} = \frac{1}{T_2} + \frac{1}{3}(\gamma g \tau)^2 D \tag{23}$$

D is the bulk diffusion coefficient, $g = \nabla \|B_0\|$ is the gradient of the static field intensity, and 2τ is the echo spacing. (For simplicity, we assume that D, g, $T_2$ have single values; they are not distributed over a range of values).

Stimulated Echo (STE)

The stimulated spin echo (see FIG. 22) has become the standard sequence in diffusion studies because it allows the observation of diffusion over relatively long times (on the order of the spin-lattice relaxation time, $T_1$)[E. L. Hahn, 'Spin Echoes,' Physical Review, Vol. 80, No. 4, p. 580–594, 1950]. The amplitude of the STE is:

$$ste = \frac{A}{2} \exp\left( -\frac{\Delta}{T_1} - \frac{2\delta}{T_2} - \gamma^2\delta^2 g^2 D[\Delta + 2\delta/3] \right) \quad (24)$$

The amplitude of a stimulated spin echo is only one half of the amplitude of a Hahn echo. However, during the diffusion time $\Delta$, the position information is stored in the amplitude of the longitudinal magnetization; therefore, the position encoding effected by the first two pulses can be retained for as long as a few times $T_1$.

Pulse Sequence: STE/CPMG

Figure 23:
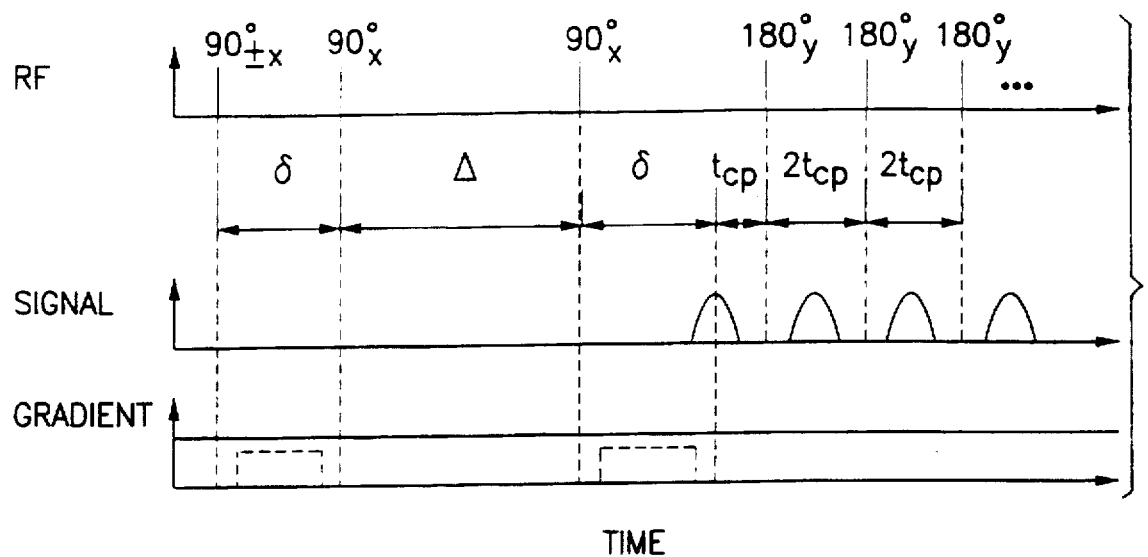
FIG. 23 illustrates repeated refocussing of the stimulated echo (first echo).

We refocus the stimulated spin echo several hundred times as in the CPMG sequence, thus collecting more signal (see FIG. 23). FIG. 23 illustrates that the stimulated echo (the first echo) can be repeatedly refocused as in the CPMG sequence. The echo spacing is so short that the relaxation rate is not affected by diffusion. This sequence is well suited for observing diffusion over long times (on the order of $T_1$) and collecting signal efficiently. It can be used with either pulsed (dashed) or static (solid) field gradient. The echo spacing ($2t_{cp}$) is so short that $$\frac{2t_{cp}}{T_2} \gg \frac{2}{3} D t_{cp}^3 \gamma^2 g^2 \quad (25)$$

diffusion does not affect the apparent spin-spin relaxation rate. The amplitude of the n th echo is:

$$e_n = \frac{A}{2} \exp\left( -\frac{\Delta}{T_1} - \frac{2\delta}{T_2} - \frac{2(n-1)t_{cp}}{T_2} - \gamma^2\delta^2 g^2 D[\Delta + 2\delta/3] \right) \quad (26)$$

The parameters A, $T_1$, and $T_2$ can be obtained by standard NMR measurements.

Figure 24:
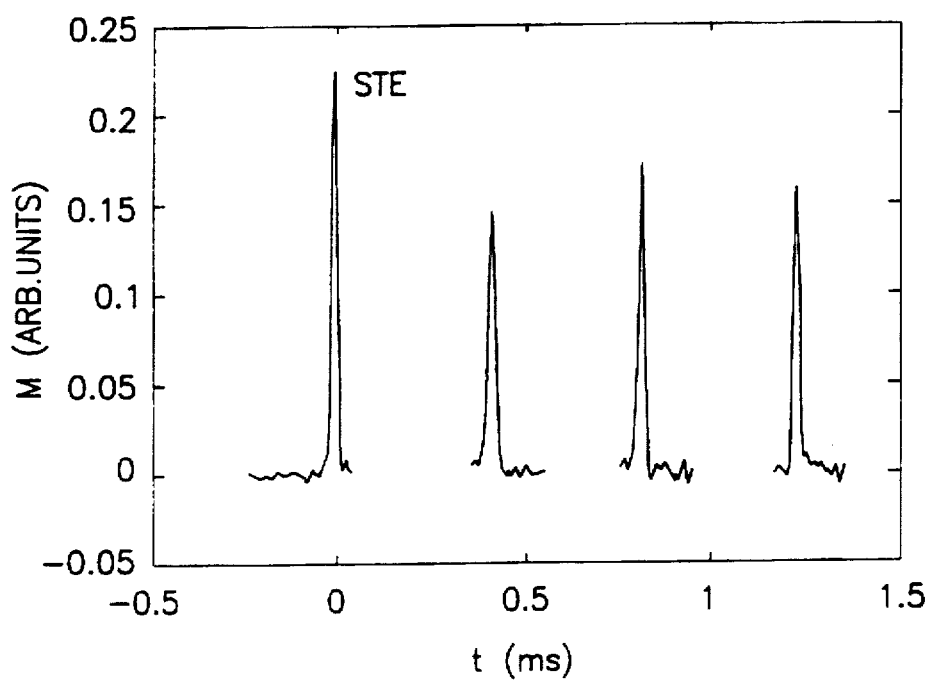
FIG. 24 shows a scope trace of STE and refocussed echoes.

FIG. 24 shows an actual scope trace of the stimulated echo (STE) and the first three refocussed echoes (0.4 ms spacing). Typically, hundred to thousand echoes are formed before the signal decays by spin-spin relaxation. The variations in the echo amplitudes are due to field inhomogeneities and they are predictable. The scope trace is suppressed in between the echoes, where $180°_y$ pulses are applied.

Nonuniform Gradients

In conventional imaging equipment, spatially uniform field gradients are produced by gradient coils driven by pulse generators and amplifiers. In borehole logging, it is not possible to produce either a constant static field or a constant field gradient in the earth formation. Furthermore, typical static field gradients of borehole NMR instruments are comparable to the gradients that can be produced by downhole coils. Using the static gradients leads to a simpler instrument. Below, we shall concentrate on using the static gradients although the pulse sequences described above are equally applicable to pulsed field gradients.

Figure 25:
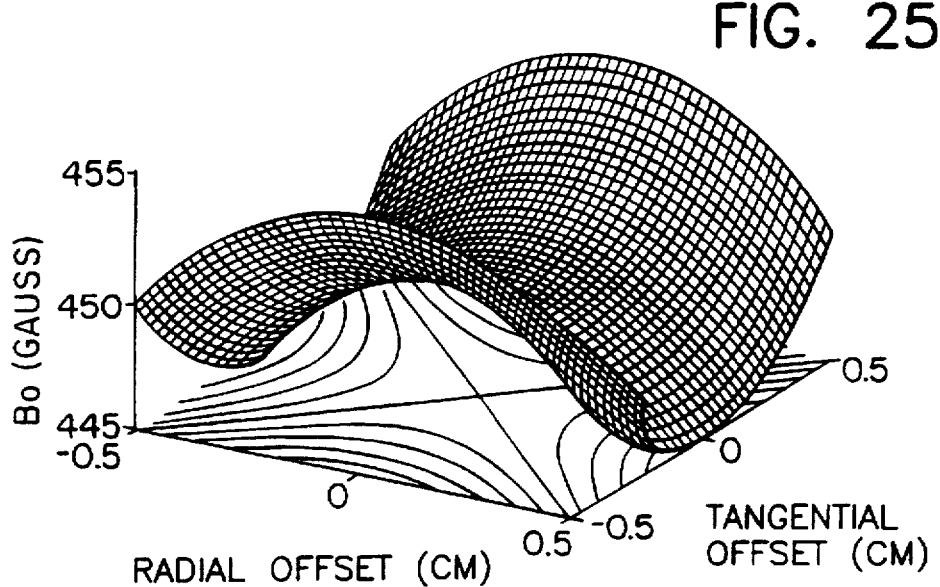
FIG. 25 illustrates the approximately quadratic field strength of regions of investigation of borehole NMR tools.

The borehole NMR tool of Schlumberger has approximately quadratic static field strengths in their regions of investigation (see FIG. 25).

$$B_0 = \text{constan } t + g_1 x^2 + g_2 y^2 \quad (27)$$

The magnitude of the field gradient $\nabla\|B_0\|$ is approximately proportional to the distance from a point at the center of the sensitive zone (when $g_1^2 \approx g_2^2$). We shall show below that nonuniform field gradients complicate but do not disable the interpretation of field gradient experiments. In typical borehole logging, water and oil molecules cannot diffuse far enough to sample the quadratic nature of the static field. For example, at 80° C., in one second, a water molecule diffuses 200 µm in bulk water and even less in a water saturated rock. FIG. 25 illustrates that the field strength of some borehole NMR instruments are approximately quadratic in their region of investigation.(Eg., $B_o = 410G + (y^2 - x^2)$ (20 G/cm$^2$). This provides nonuniform gradients.

For typical parameters ($t_{cp} = 150$ µs, $T_2 = 150$ ms), refocusing the stimulated echo repeatedly yields a factor of 250 (24 dB) improvement in the signal to noise power ratio. The gradient of the field shown in FIG. 25 does not change significantly in 200 µm:

$$g^2 = 4g_1^2 x^2 + 4g_2^2 y^2 \quad (28)$$

($-g1 = g2 = 20$ G/cm$^2$ in FIG. 25) To calculate the total signal via (24), each infinitesimal part of the sample can be treated as a sample with a constant gradient:

$$ste = \frac{A}{2} \exp\left( -\frac{\Delta}{T_1} - \frac{2\delta}{T_2} \right) \int dx\, dy \exp\left( -\gamma^2\delta^2 4(g_1^2 x^2 + g_2^2 y^2) D[\Delta + 2\delta/3] \right) \quad (29)$$

For a rectangular sensitive region of size $[-a_1, a_1] \times [-a_2, a_2]$, the stimulated echo amplitude is $$ste = \frac{A}{8} \exp\left( -\frac{\Delta}{T_1} - \frac{2\delta}{T_2} \right) \frac{\pi}{\gamma^2\delta^2 g_1 g_2 D[\Delta + 2\delta/3]} \prod_{i=1,2} erf(2\gamma\delta g_i a_i \sqrt{D[\Delta + 2\delta/3]}) \quad (30)$$

where the amplitude A is proportional to the length of the region of investigation in the third dimension and to the porosity of the specimen, and $erf(z) = (1/\sqrt{\pi})\int_{-z}^{z} e^{-t^2} dt$ is the error function.

Figure 26:
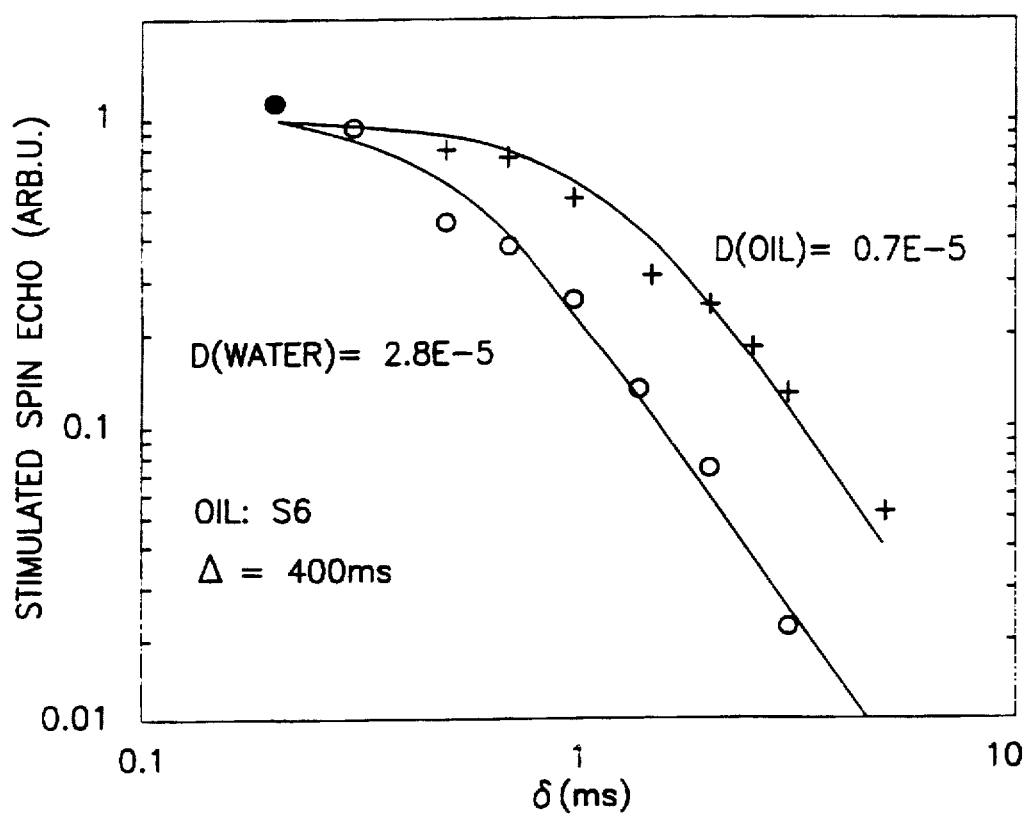
FIG. 26 shows amplitude of stimulated spin echo in arbitrary units as a function of encoding time.

This calculation is shown in FIG. 26, (solid curves) which plots stimulated spin echoes as a function of the phase encoding time $\delta$. The circles denote measurements performed on a water sample, and plus signs denote measurements performed on an oil sample [S6 viscosity standard, Cannon Instrument Company, State College, Pa. 16804], and the solid lines are calculated according to the theory described here. Two regimes are visible in the figure: in the flat region at the left, the random phase shifts due to diffusion are neglible compared to one revolution ($2\pi$) and the stimulated echo amplitude reduces to $$ste = \frac{4A a_1 a_2}{2} \exp\left( -\frac{\Delta}{T_1} - \frac{2\delta}{T_2} \right) \quad (31)$$

$$\text{when } \gamma^2 \max_{i=1,2} (g_i a_i) \sqrt{D\Delta} \ll 1 \quad (32)$$

On the right-most part of FIG. 26, the random phase shifts due to diffusion are large compared to one revolution. In this regime, the value of the error function in (30) approaches unity; thus, the amplitude of the stimulated echo reduces to $$ste = \frac{A}{8} \exp\left(-\frac{\Delta}{T_1} - \frac{2\delta}{T_2}\right) \frac{\pi}{\gamma^2 \delta^2 g_1 g_2 D |\Delta + 2\delta/3|} \quad (33)$$

when $\gamma \min(g_i, a_i) \delta \sqrt{D\Delta} \gg 1$ (34)

Notice that in a quadratically varying magnetic field, the echo amplitude behaves like $\delta^{-2}$ asymptotically, which is less pronouced than the $\exp(-\delta^2 \ldots)$ dependence in a uniform gradient.

This calculation was fitted to measurements performed on oil and water according to the pulse sequence shown in FIG. 23 using 1500 refocused echoes of the stimulated echo. The amplitudes shown in FIG. 26 were calculated by fitting an exponential decay to the train of 1500 spin echoes.

We claim:

1. A method for determining the volume of hydrocarbons in a region of investigation of earth formations surrounding a borehole, comprising the steps of:
   a) providing a logging device that is moveable through the borehole;
   b) generating, from said logging device, a static magnetic field in a volume of the formation directed to one side of the logging device;
   c) generating, from said logging device, a sequence of magnetic field pulses in the region of investigation of the formations, and detecting the nuclear magnetic resonance spin echo strength from the formations;
   d) varying a parameter of said sequence of magnetic field pulses that causes said echo strength to vary due to diffusion of fluid species in the formations, and repeating step (c) a plurality of times to detect the echo strength of further nuclear magnetic spin echoes from the formations; and
   e) determining the volume of hydrocarbons, independent of a diffusion coefficient, in the region of investigation of the earth formations from the detected spin echo strengths.

2. The method as defined by claim 1, wherein said step (e) comprises determining the volume of hydrocarbons from echo strengths associated with diffusion times longer than a predetermined diffusion time.

3. The method as defined by claim 1, wherein said step (c) comprises generating a sequence of RF magnetic field pulses and magnetic field gradient pulses.

4. The method as defined by claim 2, wherein said step (c) comprises generating a sequence of RF magnetic field pulses and magnetic field gradient pulses.

5. The method as defined by claim 3, wherein said step of generating pulses of magnetic field gradient in the formations comprises applying a direct current to an electrically conductive loop in said logging device.

6. The method as defined by claim 3, wherein the direction of the borehole axis is the z direction, the direction of the static magnetic field in a region of investigation in the formations is the y direction, and the direction of the RF magnetic field in the region of investigation is the x direction, where x, y, and z are mutually orthogonal; and wherein the direction of the gradient magnetic field in the investigation region is in the y direction and is designated By, and has a gradient dBy/dy.

7. The method as defined by claim 3, wherein the direction of the borehole axis is the z direction, the direction of the static magnetic field in a region of investigation in the formations is the y direction, and the direction of the RF magnetic field in the region of investigation is the x direction, where x, y, and z are mutually orthogonal; and wherein the direction of the gradient magnetic field in the investigation region is in the y direction and is designated By, and has a gradient dBy/dz.

8. The method as defined by claim 3, wherein the sequence of pulses and echoes is 90-$t_g$-pfg-$t_r$-180-$t_g$-pfg-$t_r$-echo$_1$-|$t_r$-180-$t_r$-echo$_{i+1}$|$_i$, where pfg is a pulsed field gradient, $t_g$ is the time between the 90 degree pulse and the pulsed field gradient, $t_r$ is the time between the pulsed field gradient and the 180 degree reversing pulse, echo$_1$ is the first spin echo, $t_i$ are Carr-Purcell spacings for the subsequent 180 degree reversing pulses and echoes (i=1, 2, . . . ).

9. The method as defined by claim 5, wherein the sequence of pulses and echoes is 90-$t_g$-pfg-$t_r$-180-$t_g$-pfg-$t_r$-echo$_1$-|$t_r$-180-$t_r$-echo$_i$|$_i$, where pfg is a pulsed field gradient, $t_g$ is the time between the 90 degree pulse and the pulsed field gradient, $t_r$ is the time between the pulsed field gradient and the 180 degree reversing pulse, echo$_1$ is the first spin echo, $t_{i+1}$ are Carr-Purcell spacings for the subsequent 180 degree reversing pulses and echoes (i=1, 2, . . . ).

10. The method as defined by claim 8, wherein the parameter of said sequence that is varied is a parameter of said magnetic field gradient pulses.

11. The method as defined by claim 1, further comprising determining the diffusion coefficient of oil in said region of investigation of the formations.

12. The method as defined by claim 2, further comprising determining the diffusion coefficient of oil in said region of investigation of the formations.

13. The method as defined by claim 1, further comprising determining the volume of water in said region of investigation of the formations.

14. The method as defined by claim 3, wherein said generating of magnetic field gradient pulses includes generating magnetic field gradient pulses of one polarity and generating magnetic field gradient pulses of opposite polarity.

15. The method as defined by claim 14, wherein said sequence of RF magnetic field pulses includes a sequence of 180 degree pulses with magnetic field gradient pulses between said 180 degree pulses, said magnetic field gradient pulses being of alternating polarity.

16. The method as defined by claim 1, wherein said magnetic field pulses are RF pulses, and wherein the sequence of pulses and echoes is:

90-$t_1$-90-$t_s$-90-$t_1$-echo where $t_1$ is the time between the initial 90 degree pulse and the second 90 degree pulse, and $t_s$ is the time between the second and third 90 degree pulses.

17. The method as defined by claim 2, wherein said magnetic field pulses are RF pulses, and wherein the sequence of pulses and echoes is:

90-$t_1$-90-$t_s$-90-$t_1$-echo where $t_1$ is the time between the initial 90 degree pulse and the second 90 degree pulse, and $t_s$ is the time between the second and third 90 degree pulses.

18. The method as defined by claim 17, further comprising determining the volume of oil in said region of investigation of the formations.

19. The method as defined by claim 17, further comprising determining the volume of water in said region of investigation of the formations.

20. A nuclear magnetic resonance method for determining the volume of hydrocarbons in a region of investigation in formations surrounding a borehole, comprising the steps of:
   a) providing a logging device that is moveable through the borehole;
   b) generating, from said logging device, a static magnetic field in said region of investigation of the formations;
   c) generating, from said logging device, a sequence of RF magnetic field pulses in said region of investigation of the formations, and detecting nuclear magnetic resonance spin echoes from said region of investigation of the formations; the sequence of pulses and echoes being:

$$90\text{-}t_1\text{-}90\text{-}t_s\text{-}90\text{-}t_1\text{-}echo_1\text{-}[t_i\text{-}180\text{-}t_i\text{-}echo_{i+1}]_i$$

where $t_1$ is the time between the initial 90 degree pulse and the second 90 degree pulse, $t_s$ is the time between the second and third 90 degree pulses, and $t_i$ are the Carr-Purcell spacings (times) for the subsequent 180 degree reversing pulses and echoes (i=1,2 ... );
   d) repeating step (c) a plurality of times with different times $t_s$; and
   e) computing the volume of oil in said region of investigation of the formations from the spin echoes detected in steps (c) and (d).

21. The method as defined by claim 20, wherein said step (e) further comprises computing the diffusion coefficient of oil in said region of investigation.

22. The method as defined by claim 20, wherein said step (e) further comprises computing the volume of water in said region of investigation.

23. The method as defined by claim 21, wherein said step (e) further comprises computing the volume of water in said region of investigation.

24. Nuclear magnetic logging apparatus for determining a characteristic of formations surrounding a borehole, comprising:
   a logging device that is moveable through the borehole;
   means in said logging device for generating a static magnetic field in a volume of the formation directed to one side of the logging device;
   means in said logging device for generating a sequence of RF magnetic field pulses and magnetic field gradient pulses in the formations, and for detecting nuclear magnetic resonance spin echoes from the formations, comprising:
      an RF antenna comprising a trough-shaped conductor, disposed in said logging device with the open end of said trough facing the borehole wall, and wherein a gradient field antenna comprises a split body of the trough-shaped conductor shorted at one end, means for applying a sequence of RF pulses to said RF antenna, and a detector circuit coupled with said RF antenna; and
   means for determining said characteristic of the formations from the detected spin echoes.

25. Apparatus as defined by claim 24, wherein said means for generating a sequence of RF magnetic field pulses and magnetic field gradient pulses in the formations, and for detecting nuclear magnetic resonance spin echoes from the formations includes means for generating pulses and detecting echoes in the following sequence:

$$90\text{-}t_g\text{-}pfg\text{-}t_r\text{-}180\text{-}t_g\text{-}pfg\text{-}t_r\text{-}echo_1\text{-}[t_i\text{-}180\text{-}t_i\text{-}echo_{i+1}]_i$$

where pfg is a pulsed field gradient, $t_g$ is the time between the 90 degree pulse and the pulsed field gradient, $t_r$ is the time between the pulsed field gradient and the 180 degree reversing pulse, $echo_1$ is the first spin echo, $t_i$ are Carr-Purcell spacings for the subsequent 180 degree reversing pulses and echoes (i=1, 2, ... ).

26. Apparatus as defined by claim 24, further comprising means for switching the direction of the current applied to said gradient field antenna, so as to reverse the polarity of the generated magnetic field gradient.

27. A method for characterizing a parameter of a region of investigation of an earth formation surrounding a borehole, comprising the steps of:
   a) providing a logging device that is moveable through the borehole;
   b) generating, from said logging device, a static magnetic field in a volume of the formation directed to one side of the logging device;
   c) generating, from said logging device, a sequence of magnetic field pulses in the region of investigation of the formation, and detecting the nuclear magnetic resonance spin echo strength from the formation;
   d) varying a parameter of said sequence of magnetic field pulses that causes said echo strength to vary due to diffusion of fluid species in the formation, and repeating step (c) a plurality of times to detect the echo strength of further nuclear magnetic spin echoes from the formation;
   e) producing, with said logging device, a signal indicating a volume of hydrocarbons, independent of a diffusion coefficient, in the region of investigation of the earth formation from the detected spin echo strengths; and
   f) characterizing the earth formation parameter using the signal indicating the volume of hydrocarbons.

28. The method of claim 27 including characterizing the parameter while drilling the borehole into the formation.

29. A method for characterizing a parameter of a region of investigation of an earth formation surrounding a borehole, comprising the steps of:
   a) providing a logging device that is moveable through the borehole;
   b) generating, from said logging device, a static magnetic field in a volume of the formation directed to one side of the logging device;
   c) generating, from said logging device, a sequence of magnetic field pulses in the region of investigation of the formation, and detecting the nuclear magnetic resonance spin echo strength from the formation;
   d) varying a parameter of said sequence of magnetic field pulses that causes said echo strength to vary with the diffusion times of fluid species in the formation, and repeating step (c) a plurality of times to detect the echo strength of further nuclear magnetic spin echoes from the formation;
   e) producing, with said logging device, a signal indicating a volume of hydrocarbons in the region of investigation of the earth formation from the detected spin echo strengths;
   f) characterizing the earth formation parameter using the signal indicating the volume of hydrocarbons; and
   g) characterizing the parameter while drilling the borehole into the formation.

30. The method as defined by claim 1, wherein the sequence of pulses and echoes is $$90\text{-}t_e\text{-}180\text{-}t_e\text{-}echo_1\text{-}[t_i\text{-}180\text{-}t_i\text{-}echo_{i+1}]_i$$

where $t_e$ is the time between the initial ninety degree pulse and the 180 degree reversing pulse and the time between the 180 degree reversing pulse and the first spin echo, $echo_1$ is the first spin echo, and $t_i$ are Carr-Purcell spacings for the subsequent 180 degree reversing pulses and echoes (i=1, 2, ...).

31. The method as defined by claim 1, wherein said magnetic field pulses are RF pulses, and wherein the sequence of pulses and echoes is:

$$90\text{-}t_g\text{-}pfg\text{-}t_r\text{-}90\text{-}t_s\text{-}90\text{-}t_g\text{-}pfg\text{-}t_r\text{-}echo$$

where pfg is a pulsed field gradient, $t_g$ is the time between the initial ninety degree pulse and the pulse field gradient, tr is the time between the pulse field gradient and the second ninety degree pulse, and $t_s$ is the time between the second and third 90 degree pulses.

32. The method of claim 31, the sequence including a Carr-Purcell-Meiboom-Gill pulse sequence.

33. The method as defined by claim 1, wherein the sequence of pulses and echoes is:

$$90\text{-}t_e\text{-}180\text{-}t_e\text{-}echo_1,$$

where $t_e$ is the time between the initial ninety degree pulse and the 180 degree reversing pulse and the time between the 180 degree reversing pulse and the first spin echo, $echo_1$ is the first spin echo.

34. The method as defined by claim 3, wherein the sequence of pulses and echoes is $$90\text{-}t_g\text{-}pfg\text{-}t_r\text{-}180\text{-}t_g\text{-}pfg\text{-}t_r\text{-}echo_1,$$

where pfg is a pulsed field gradient, $t_g$ is the time between the 90 degree pulse and the pulsed field gradient, $t_r$ is the time between the pulsed field gradient and the 180 degree reversing pulse, and $echo_1$ is the first spin echo.

* * * * *